US010475131B1

(12) United States Patent
Cabrera et al.

(10) Patent No.: US 10,475,131 B1
(45) Date of Patent: Nov. 12, 2019

(54) METHODS, SYSTEMS AND COMPUTER PROGRAM PRODUCTS FOR CALCULATING AN ESTIMATED RESULT OF A TAX RETURN

(71) Applicant: INTUIT INC., Mountain View, CA (US)

(72) Inventors: Luis Felipe Cabrera, Bellevue, WA (US); William T. Laaser, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 486 days.

(21) Appl. No.: 15/008,085

(22) Filed: Jan. 27, 2016

(51) Int. Cl.
G06Q 40/00 (2012.01)
(52) U.S. Cl.
CPC .................. G06Q 40/123 (2013.12)
(58) Field of Classification Search
USPC ........................................................... 705/31
See application file for complete search history.

(56) References Cited

U.S. PATENT DOCUMENTS

| 5,884,283 | A | 3/1999 | Manos |
| 6,021,397 | A | 2/2000 | Jones et al. |
| 7,539,635 | B1 | 5/2009 | Peak et al. |
| 7,788,195 | B1 | 8/2010 | Subrannanian |
| 8,190,499 | B1 | 5/2012 | McVickar |
| 8,635,127 | B1 | 1/2014 | Shaw |
| 9,128,911 | B1 * | 9/2015 | Howe ............ G06Q 40/10 |
| 2005/0038722 | A1 | 2/2005 | Throndson et al. |
| 2006/0122918 | A1 | 6/2006 | Graboske et al. |
| 2007/0033116 | A1 | 2/2007 | Murray |
| 2010/0017348 | A1 | 1/2010 | Pinckney et al. |
| 2011/0258195 | A1 | 10/2011 | Welling et al. |
| 2012/0030159 | A1 | 2/2012 | Pilaszy et al. |
| 2012/0084185 | A1 | 4/2012 | Ciaramitaro et al. |

(Continued)

FOREIGN PATENT DOCUMENTS

KR 10-2013-0027811 3/2013

OTHER PUBLICATIONS

International Search Report issued in PCT/US2014/056516 dated Jun. 18, 2015.

(Continued)

Primary Examiner — William E Rankins
(74) Attorney, Agent, or Firm — DLA Piper LLP US

(57) ABSTRACT

A system for calculating an estimated result for an electronic tax return to be prepared before a user begins to prepare the electronic tax return using an electronic tax return preparation program includes a server computer having a predictive model, and a user computer having a browser program. The user computer and the browser program are operatively coupled to the server computer and the predictive model by a network. The server computer is configured to obtain a first taxpayer datum associated with a taxpayer and execute the predictive model, which generates a predicted taxpayer datum for the taxpayer based on the first taxpayer datum. The server computer is configured to calculate the estimated result using the predicted taxpayer datum. The user computer is configured to display the estimated result to the user before the user begins to prepare the electronic tax return using the electronic tax return preparation program.

52 Claims, 16 Drawing Sheets

(56) References Cited

U.S. PATENT DOCUMENTS

| | | |
|---|---|---|
| 2012/0109792 A1 | 5/2012 | Eftekhari et al. |
| 2013/0198047 A1 | 8/2013 | Houseworth et al. |
| 2013/0282539 A1 | 10/2013 | Murray |
| 2014/0337189 A1 | 11/2014 | Barsade et al. |
| 2015/0058188 A1* | 2/2015 | Bartlett ................ G06Q 40/123 705/31 |
| 2017/0213294 A1* | 7/2017 | Cabrera ............... G06Q 40/123 |

OTHER PUBLICATIONS

Written Opinion issued in PCT/US2014/056516 dated Jun. 18, 2015.

U.S. Appl. No. 14/674,582, filed Mar. 31, 2015.

* cited by examiner

METHODS, SYSTEMS AND COMPUTER PROGRAM PRODUCTS FOR CALCULATING AN ESTIMATED RESULT OF A TAX RETURN

This application includes subject matter similar to the subject matter described in the following co-owned applications: (1) U.S. application Ser. No. 14/484,119, filed Sep. 11, 2014, entitled "Methods System and Articles of Manufacture for Using a Predictive Model to Determine Tax Topics Which are Relevant to a Taxpayer in Preparing an Electronic Tax Return"; (2) U.S. application Ser. No. 14/530,305, filed Oct. 31, 2014, entitled "Identification of Electronic Tax Return Errors Based on Declarative Constraints"; (3) U.S. application Ser. No. 14/530,369, filed Oct. 31, 2014, entitled "Predictive Model Based Identification of Potential Errors in Electronic Tax Return"; (4) U.S. application Ser. No. 14/674,582, filed Mar. 31, 2015, entitled "Methods, Systems and Computer Program Products for Calculating an Estimated Result of a Tax Return"; (5) U.S. application Ser. No. 14/607,935, entitled "Methods and Systems for Identifying Product Defects Within a Tax Return Preparation System"; (6) U.S. application Ser. No. 14/698,645, filed Apr. 28, 2015, entitled "Systems for Identifying Abandonment Indicators for an Electronic Tax Return Preparation Program"; (7) U.S. application Ser. No. 14/698,683, filed Apr. 28, 2015, entitled "Systems for Allocating Resources Based on Electronic Tax Return Preparation Program User Characteristics"; and (8) U.S. application Ser. No. 15/008,025, filed Jan. 27, 2016, entitled "Methods, Systems and Computer Program Products for Calculating an Estimated Result of a Tax Return." The contents of of which are fully incorporated herein by reference as though set forth in full.

SUMMARY

Embodiments are directed to systems, computer-implemented methods, and computer program products for calculating an estimated result while preparing an electronic tax return.

In one embodiment directed to a system for calculating an estimated result for an electronic tax return to be prepared before a user begins to prepare the electronic tax return using an electronic tax return preparation program, the system includes a server computer having a predictive model running thereon. The system also includes a user computer having a browser program running thereon. The user computer and the browser program are operatively coupled to the server computer and the predictive model, respectively, by a network. The server computer is configured to obtain a first taxpayer datum associated with a taxpayer and execute the predictive model. The predictive model, when executed, generates a predicted taxpayer datum for the taxpayer based on the first taxpayer datum. The server computer is configured to calculate the estimated result using the predicted taxpayer datum. The user computer is configured to display the estimated result to the user before the user begins to prepare the electronic tax return using the electronic tax return preparation program.

In a single or multiple embodiments, the user computer is configured to display the estimated result to the user before the electronic tax return preparation program is available from a source, before the electronic tax return preparation program is updated, and/or before the electronic tax return preparation program is purchased by the user.

In a single or multiple embodiments, the user computer is configured to display the estimated result to the user before a tax document is available from an employer of the user, before a tax document is available from a financial institution hosting a financial account of the user, before the user has filed a tax return for the prior tax year, and/or before all taxpayer data required to prepare the electronic tax return is available to the user. The user computer may be configured to display the estimated result to the user even when the user is not able to begin preparing the electronic tax return.

In a single or multiple embodiments, the predictive model is an algorithm that was created using a modeling technique selected from the group consisting of Pearson product-moment correction; sensitivity analysis; logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

In a single or multiple embodiments, the server computer is configured to obtain a second taxpayer datum associated with the taxpayer. The predictive model, when executed, may analyze the second taxpayer datum to identify a taxpayer data source as relevant to the estimated result for the taxpayer, and to determine a relevance value associated with the estimated result for the taxpayer. The user computer may be configured to display an identity of the taxpayer data source and the associated relevance value to the user before the user begins to prepare the electronic tax return using the electronic tax return preparation program. The associated relevance value may be relative to all taxpayers or relative to the taxpayer.

In a single or multiple embodiments, the server computer is configured to obtain the first taxpayer datum from the user or from a taxpayer data computer. The server computer may be configured to obtain the second taxpayer datum from the user or from the taxpayer data computer. The taxpayer data computer may be a third party computer. The taxpayer data computer may be associated with a source selected from the group consisting of a proprietary source, a census data source, a government source, a commercial source, and an Internet history source.

In a single or multiple embodiments, the predictive model includes data analytics. Executing the predictive model may include calculating a Pearson product-moment correlation coefficient. Executing the predictive model may include performing a cohort analysis. Executing the predictive model may include determining a correlation between a plurality of taxpayer data categories and the estimated result.

In a single or multiple embodiments, executing the predictive model includes determining a correlation between a first taxpayer data category and second taxpayer data category. The server computing device may be configured to calculate the estimated result using taxpayer data associated with the second taxpayer data category.

Another embodiment is directed to a computer-implemented method for calculating an estimated result for an electronic tax return to be prepared before a user begins to prepare the electronic tax return using an electronic tax return preparation program. The method includes obtaining a first taxpayer datum associated with a taxpayer. The method also includes executing a predictive model. The method further includes generating a predicted taxpayer datum for the taxpayer based on the first taxpayer datum. Moreover, the method includes calculating the estimated result using the predicted taxpayer datum. In addition, the method includes calculating the estimated result for the taxpayer based, at least in part, on the second taxpayer datum. The method includes displaying the estimated result to the user before the user begins to prepare the electronic tax return using the electronic tax return preparation program.

In a single or multiple embodiments, the estimated result is displayed to the user before the electronic tax return preparation program is available from a source, before the electronic tax return preparation program is updated, and/or before the electronic tax return preparation program is purchased by the user.

In a single or multiple embodiments, the estimated result is displayed to the user before a tax document is available from an employer of the user, before a tax document is available from a financial institution hosting a financial account of the user, before the user has filed a tax return for the prior tax year, and/or before all taxpayer data required to prepare the electronic tax return is available to the user. The user computer may be configured to display the estimated result to the user even when the user is not able to begin preparing the electronic tax return.

In a single or multiple embodiments, the predictive model is an algorithm that was created using a modeling technique selected from the group consisting of Pearson product-moment correction; sensitivity analysis; logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

In a single or multiple embodiments, the method also includes obtaining a second taxpayer datum associated with the taxpayer. The method further includes analyzing the second taxpayer datum to identify a taxpayer data source as relevant to the estimated result for the taxpayer, and to determine a relevance value associated with the estimated result for the taxpayer. Moreover, the method includes displaying an identity of the taxpayer data source and the associated relevance value to the user before the user begins to prepare the electronic tax return using the electronic tax return preparation program. The associated relevance value may be relative to all taxpayers or relative to the taxpayer.

In a single or multiple embodiments, the first taxpayer datum is obtained from the user or from a taxpayer data computer. The second taxpayer datum may also be obtained from the user or from the taxpayer data computer. The taxpayer data computer may be a third party computer. The taxpayer data computer may be associated with a source selected from the group consisting of a proprietary source, a census data source, a government source, a commercial source, and an Internet history source.

In a single or multiple embodiments, the predictive model includes data analytics. Executing the predictive model may include calculating a Pearson product-moment correlation coefficient. Executing the predictive model may include performing a cohort analysis. Executing the predictive model may include determining a correlation between a plurality of taxpayer data categories and the estimated result.

In a single or multiple embodiments, executing the predictive model includes determining a correlation between a first taxpayer data category and second taxpayer data category. The server computing device may be configured to calculate the estimated result using taxpayer data associated with the second taxpayer data category.

Still another embodiment is directed to a computer program product including a non-transitory computer readable storage medium embodying one or more instructions executable by a computer system having a server computer and a user computer to perform a process for calculating an estimated result for an electronic tax return to be prepared before a user begins to prepare the electronic tax return using an electronic tax return preparation program. The process includes obtaining a first taxpayer datum associated with a taxpayer. The process also includes executing a predictive model. The process further includes generating a predicted taxpayer datum for the taxpayer based on the first taxpayer datum. Moreover, the process includes calculating the estimated result using the predicted taxpayer datum. In addition, the process includes calculating the estimated result for the taxpayer based, at least in part, on the second taxpayer datum. The process includes displaying the estimated result to the user before the user begins to prepare the electronic tax return using the electronic tax return preparation program.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1:
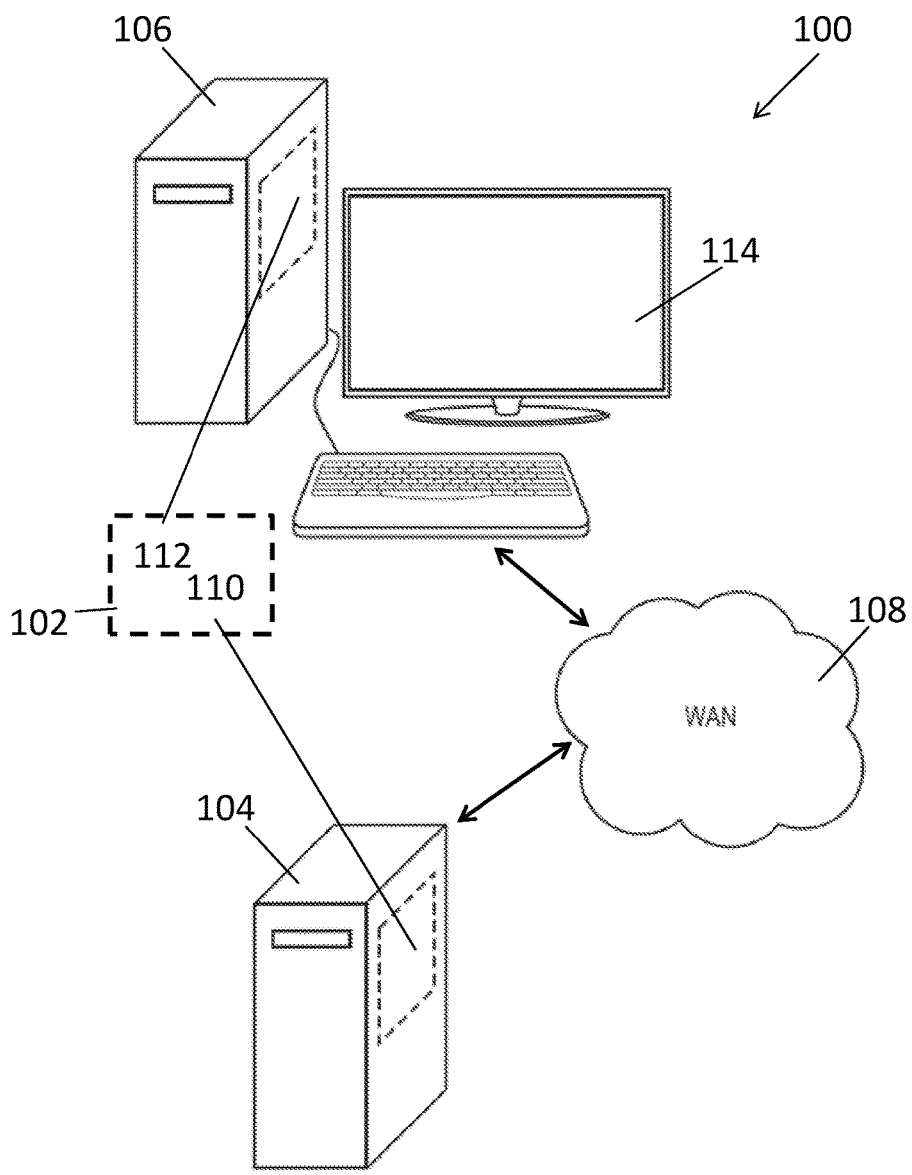
FIGS. 1 to 3 are schematic diagrams illustrating the implementation of estimated result calculation systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments describe methods, systems and articles of manufacture for calculating an estimated result for an electronic tax return to be prepared. In particular, the embodiments describe calculating an estimated result before a user begins to prepare the electronic tax return using an electronic tax return preparation program. The embodiments also describe identifying relevant taxpayer data sources and determining associated relevance values.

Some current electronic tax return preparation systems are configured to calculate an estimated result, which is displayed to a user during entry of taxpayer data as an aid to the user. Current systems calculate the estimated result based on entered taxpayer data, with all other taxpayer data set to empty, zero or not applicable. Other systems predict yet to be entered taxpayer data to generate a more accurate estimated result as described in U.S. application Ser. No. 14/674,582, filed Mar. 31, 2015, the contents of which have been previously incorporated-by-reference herein. Current systems generate estimated results during the preparation of electronic tax returns based on already entered or obtained taxpayer data. However, taxpayers can benefit from estimated results even before they begin to prepare their tax returns. Current systems do not address this need.

Also, even with prediction of yet to be entered taxpayer data, current systems obtain taxpayer data in a predetermined order without regard to the relevance of the taxpayer data to a particular taxpayer's estimated result. U.S. application Ser. No. 15/008,025, filed Jan. 27, 2016, the contents of which have been previously incorporated-by-reference herein, describes a system for identifying most relevant taxpayer data categories during the preparation of electronic tax returns based on already entered or obtained taxpayer data. However, taxpayer can also benefit from understanding the respective relevance of possible taxpayer data sources even before they have obtained any taxpayer information to prepare their tax returns for the current tax year. This allows taxpayers to better direct their time/energy/resources (or that of the system) to obtain taxpayer information for estimating their tax results. Current systems do not address this need.

The embodiments described herein are directed to calculating an estimated result of an electronic tax return before a user begins to prepare the electronic tax return using an electronic tax return preparation program. The embodiments use predictive models to generate predicted taxpayer data, which is then used to calculate the estimated result. The predictive models can generate predicted taxpayer data using taxpayer data including data that may not be used in the actual calculation of the tax result (e.g., tax due or refund). Therefore, the embodiments allow users to calculate estimated results before the users begin to prepare their electronic tax returns.

The embodiments described herein also facilitate efficient collection of more relevant taxpayer information by using a predictive model to identify taxpayer data sources that should be more relevant to a particular taxpayer's estimated result. The embodiments also determine relevance values associated with the taxpayer data sources. The user can use the identified sources and relevance values to direct more of their time/energy/resources (or that of the system) to obtaining data from more relevant taxpayer data sources (i.e., with higher relevance values), which can be used to generate an estimated result. Obtaining the more relevant taxpayer data provides a more accurate estimated result because the more relevant taxpayer data that is more likely to affect the estimated result. Therefore, the embodiments allow users to more efficiently generate more accurate estimated results before the user begins to prepare their electronic tax return.

The described embodiments can provide estimated results for many taxpayers in different situations. For instance, a taxpayer may be planning a summer vacation in early January. Although all of the taxpayer data required to calculate the tax result (e.g., total tax, refund, amount due, etc.) is not available in January (e.g., W-2 forms), the taxpayer's summer vacation budget will be impacted by the tax result. The described embodiments provide an estimated result and guide collection of taxpayer data from high relevance sources for more efficiently calculating a more accurate estimated result. The taxpayer can use this estimated result to plan their summer vacation.

Another taxpayer may be considering changing their withholding in response to several significant life events in July (having a first baby and buying a house). Although all of the taxpayer data required to calculate the tax result (e.g., total tax, refund, amount due, etc.) is not available in July (e.g., W-2 forms), the taxpayer's withholding will be impacted by the tax result. The taxpayer suspects that their taxes will be significantly lower than before the life events, but they are unsure of whether they can lower their withholding. The described embodiments provide an estimated result and guide collection of taxpayer data from high relevance sources for more efficiently calculating a more accurate estimated result. The taxpayer can use this estimated result to determine whether and by how much they reduce their withholding.

The embodiments described herein address the computer-specific problem of allocating system resources to obtain taxpayer data to calculate an estimated result before a user begins to prepare their electronic tax return. Some embodiments address this issue by leveraging data available through the Internet to identify taxpayer data sources more relevant to the estimated result of a particular taxpayer, and to determine relevance values associated with the taxpayer data sources. The embodiments can use the identities of the more relevant taxpayer data sources and the associated relevance values to more efficiently obtain taxpayer data to calculate an estimated result before a user begins to prepare their electronic tax return.

As used in this application, a "preparer," "user" or "taxpayer" includes, but is not limited to, a person preparing a tax return using tax return preparation software. The "preparer," "user" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's income tax burden, including information typically included in a tax return. As used in this application, "taxpayer data" includes, but is not limited to, information relating to a taxpayer, including, but not limited to, tax data. The terms "tax data" and "taxpayer data," as used in this application, also include, but are not limited to, partially or fully completed tax forms (electronic and hard copy) that include information typically included in a tax return.

As used in this application, "taxpayer data category" includes, but is not limited to, a generic class of tax data (e.g., mortgage interest paid or property tax paid). As used in this application, "taxpayer data source" includes, but is not limited to, a source of tax data (e.g., lender for mortgage interest paid or county tax collector for property tax paid). As used in this application, "estimated result" includes, but is not limited to, a tax return preparation result calculated from less than all of the required tax data (e.g., total taxes due—line 63 on Form 1040, refund—line 75 on Form 1040, or amount owed—line 78 on Form 1040). As used in this application, "a taxpayer data source or category being most relevant to an estimated result" includes, but is not limited to having the largest effect on the estimated result, per percentage change in value of the data in the taxpayer data source or category.

As used in this application, "financial management system" includes, but is not limited to, software that oversees and governs an entity's income, expenses, and assets. An exemplary financial management system is MINT Financial Management Software, which is available from Intuit Inc. of Mountain View, Calif. A financial management system is executed to assist a user with managing its finances, and is used solely for financial management. Financial management systems manage financial transaction data from financial transaction generators such as accounts including checking, savings, money market, credit card, stock, loan, mortgage, payroll or other types of account. Such financial transaction generators can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, Microsoft Money Financial Management Software and YODLEE Financial Management Software (available from Yodlee, Inc. of Redwood City, Calif.).

As used in this application, "tax code" includes, but is not limited to, taxation-related statutes and regulations for various jurisdictions (e.g., state and federal), including the United States of America and other jurisdictions around the world.

As used in this application, "computer," "computer device," or "computing device" includes, but are not limited to, a computer (laptop or desktop) and a computer or computing device of a mobile communication device, smartphone and tablet computing device such as an IPAD (available from Apple Inc. of Cupertino, Calif.). As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" includes, but are not limited to, one or more separate and independent software and/or hardware components of a computer that must be added to a general purpose computer before the computer can prepare tax returns, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data or hardware and software resources among the other computers and software, and computers having such components added thereto. As used in this application, "predictive model" includes, but is not limited to, one or more separate and independent components of a computer that must be added to a general purpose computer before the computer can identify a taxpayer data category as most relevant to an estimated result for a particular taxpayer.

As used in this application, "input/output module" includes, but is not limited to, one or more separate and independent software and/or hardware components of a computer that must be added to a general purpose computer before the computer can communicate with and facilitate the receipt and transfer of information, including taxpayer data and data relating to taxpayer data sources, from and to other computers. As used in this application, "memory module" includes, but is not limited to, one or more separate and independent software and/or hardware components of a computer that must be added to a general purpose computer before the computer can store information, including taxpayer data and data relating to taxpayer data sources. As used in this application, "correlation/relevance module" includes, but is not limited to, one or more separate and independent software and/or hardware components of a computer that must be added to a general purpose computer before the computer can determine the correlation and/or relevance of a taxpayer data category to an estimated result. As used in this application, "result estimator" includes, but is not limited to, one or more separate and independent software and/or hardware components of a computer that must be added to a general purpose computer before the computer can calculate an estimated tax result.

As used in this application, "website" includes, but is not limited to, one or more operatively coupled webpages. As used in this application, "browser" or "web browser" includes, but is not limited to, one or more separate and independent software and/or hardware components of a computer that must be added to a general purpose computer before the computer can receive, display and transmit resources from/to the World Wide Web.

FIG. 1 depicts an exemplary hardware system 100 on which an estimated result calculation system 102 according to one embodiment can be executed. The hardware system 100 according to this embodiment includes a server computing device 104 and a user computing device 106, which are operatively coupled via a network 108. The network 108 may be two or more networks depending on the system configuration and communication protocols employed. One or more or all of networks 108 may be, for example, a wireless or cellular network, a Local Area Network (LAN) and/or a Wide Area Network (WAN). Reference to network 108 generally is not intended to refer to a specific network or communications protocol, and embodiments can be implemented using various networks 108 and combinations thereof.

The estimated result calculation system 102 includes a predictive model 110 running on the server computing device 104 and a browser 112 running on the user computing device 106. The browser 112 is operatively coupled to the predictive model 110 via the network 108, to facilitate a user physically interfacing with the user computing device 106 to interface with the predictive model 110 running on the server computing device 104. The various computing devices 104, 106 may include visual displays or screens 114 operatively coupled thereto. In the embodiment depicted in FIG. 1, the user computing device 106 includes a display or a screen 114 through which a user physically interfaces with the user computing device 106 and the browser 112 running thereon.

While the user computing device 106 in FIG. 1 is depicted as a desktop computer providing access to the predictive model 110 through a browser 112 running thereon, in other embodiments, the user may access the predictive model 110 using a specific program running on the user computing device 106. In some embodiments, the user computing device 106 is a mobile computing device (e.g., mobile phone or tablet computer). In such embodiments, the user may access the predictive model 110 using an application; and communication between the two computers 104, 106 may occur over a private communication network (e.g., mobile phone network).

Figure 2:
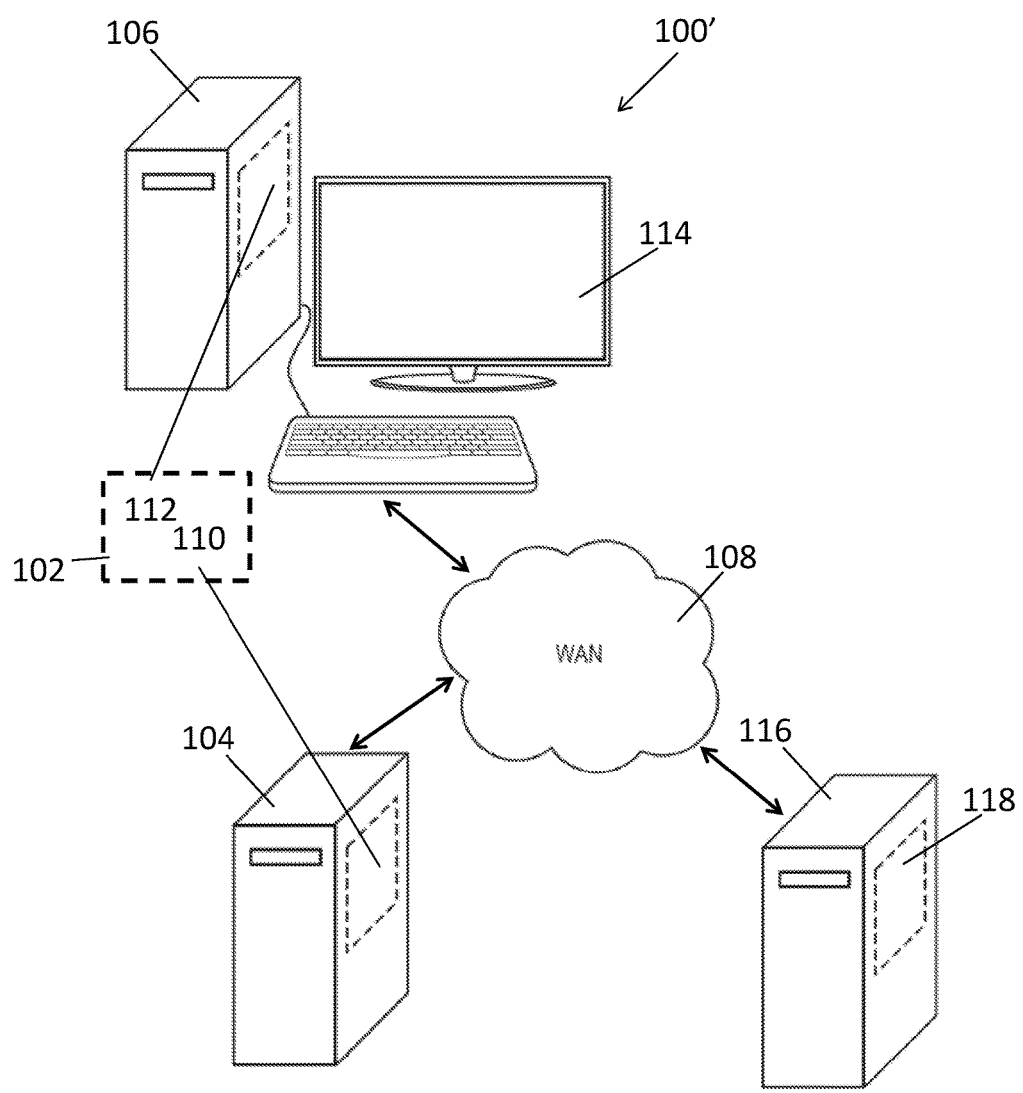

FIG. 2 depicts another exemplary hardware system 100' on which an estimated result calculation system 102 according to another embodiment can be executed. The hardware system 100' depicted in FIG. 2 is similar to the hardware system 100 depicted in FIG. 1. However, in addition to the server computing device 104 and the user computing device 106, the hardware system 100' also includes a taxpayer data source computing device 116 operatively coupled to the server computing device 104 and the user computing device 106 via the network 108. The taxpayer data source computing device 116 hosts a taxpayer data source program 118, from which the server computing device 104 and the user computing device 106 may obtain taxpayer data.

Exemplary taxpayer data source programs 118 include financial management systems utilized by the taxpayer (such as MINT or QUICKEN financial management systems), accounts the taxpayer has with an online social media website, third parties databases or resources (such as government databases or documents, such as property tax records, Department of Motor Vehicle (DMV) records), and other external sources of taxpayer data. MINT and QUICKEN are registered trademarks of Intuit Inc., Mountain View, Calif. While FIG. 2 depicts the server computing device 104, the user computing device 106 and the taxpayer data source computing device 116 as being operatively coupled by the same network 108, in other embodiments, these computing devices may be operatively coupled by two or three networks. While FIG. 2 depicts the predictive model 110 and the taxpayer data source program 118 as running on separate computing devices 104, 116, in other embodiments, the predictive model 110 and the taxpayer data source program 118 may run on the same computing device (e.g., the server computing device 104).

Figure 3:
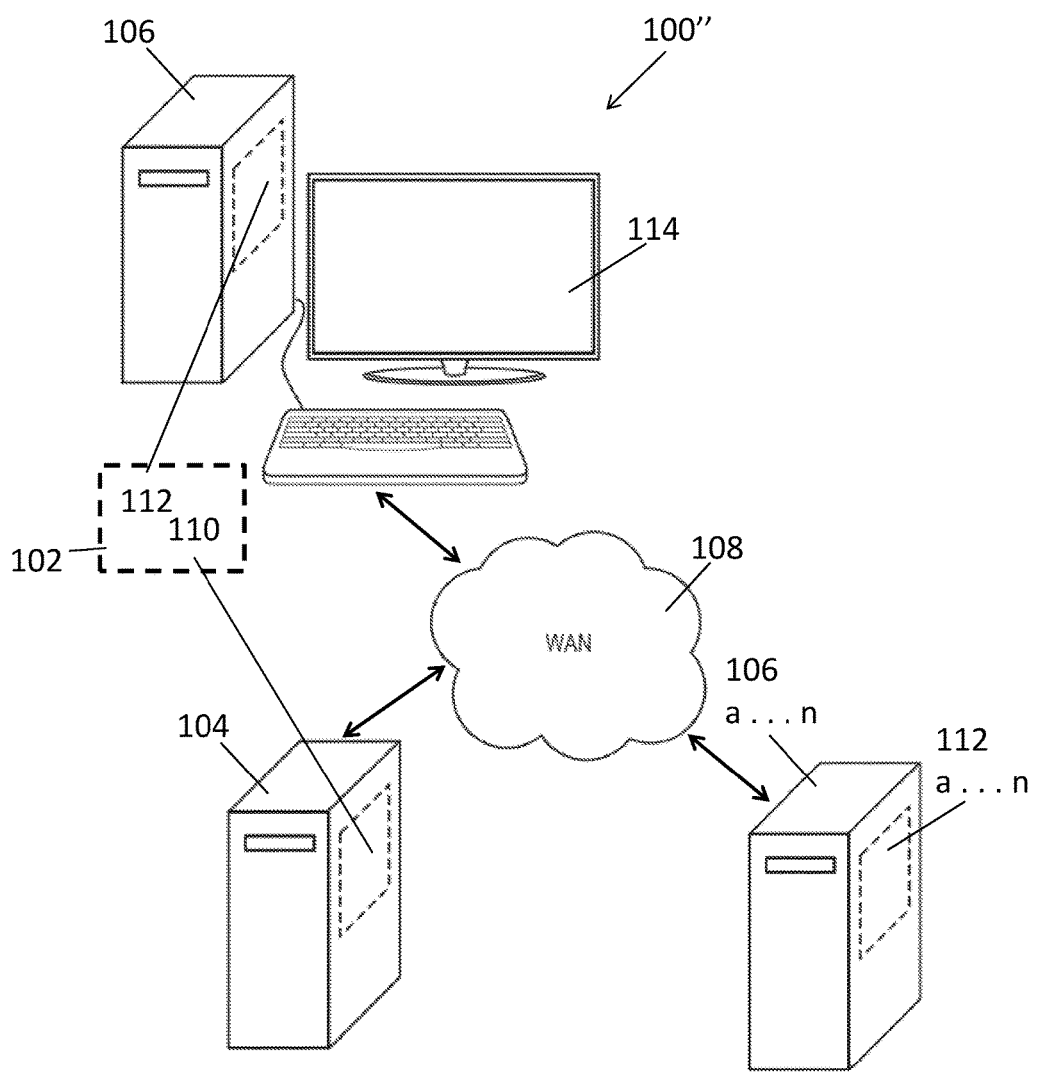

FIG. 3 depicts still another exemplary hardware system 100" on which an estimated result calculation system 102 according to still another embodiment can be executed. The hardware system 100" depicted in FIG. 3 is similar to the hardware system 100 depicted in FIG. 1. However, in addition to the server computing device 104 and the user computing device 106, the hardware system 100" also includes a plurality of other user computing device 106a . . . 106n (belonging to other users) operatively coupled to the server computing device 104 and the user computing device 106 via the network 108. The plurality of other user computing device 106a . . . 106n hosts a respective plurality of other user programs 112a . . . 112n (e.g., tax return preparation programs), from which the server computing device 104 and the user computing device 106 may obtain taxpayer data (e.g., for cohort analysis described below).

Exemplary taxpayer data that may be obtained from the plurality of other user programs 112a . . . 112n include anonymized taxpayer data associated with a plurality of taxpayers. While FIG. 3 depicts the server computing device 104, the user computing device 106 and the plurality of other user computing device 106a . . . 106n as being operatively coupled by the same network 108, in other embodiments, these computing devices may be operatively coupled by a plurality of networks. While FIG. 3 depicts the predictive model 110 and the plurality of other user programs 112a . . . 112n as running on separate computing devices 104, 106a . . . 106n, in other embodiments, the predictive model 110 and the plurality of user programs 112a . . . 112n may run on the same computing device (e.g., the server computing device 104).

Figure 4:
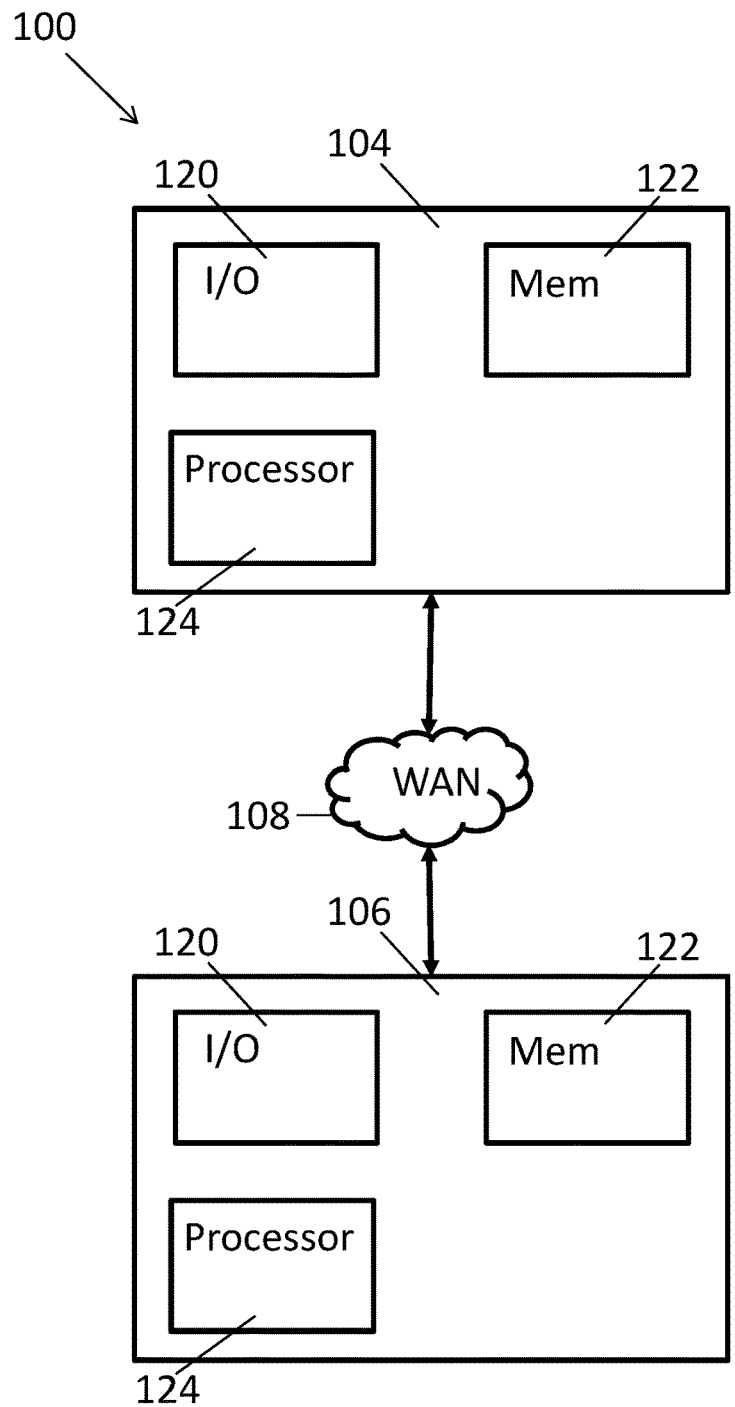
FIGS. 4 to 7 are block diagrams of computer systems according to various embodiments on which estimated result calculation systems according to various embodiments may be implemented.
Figure 5:
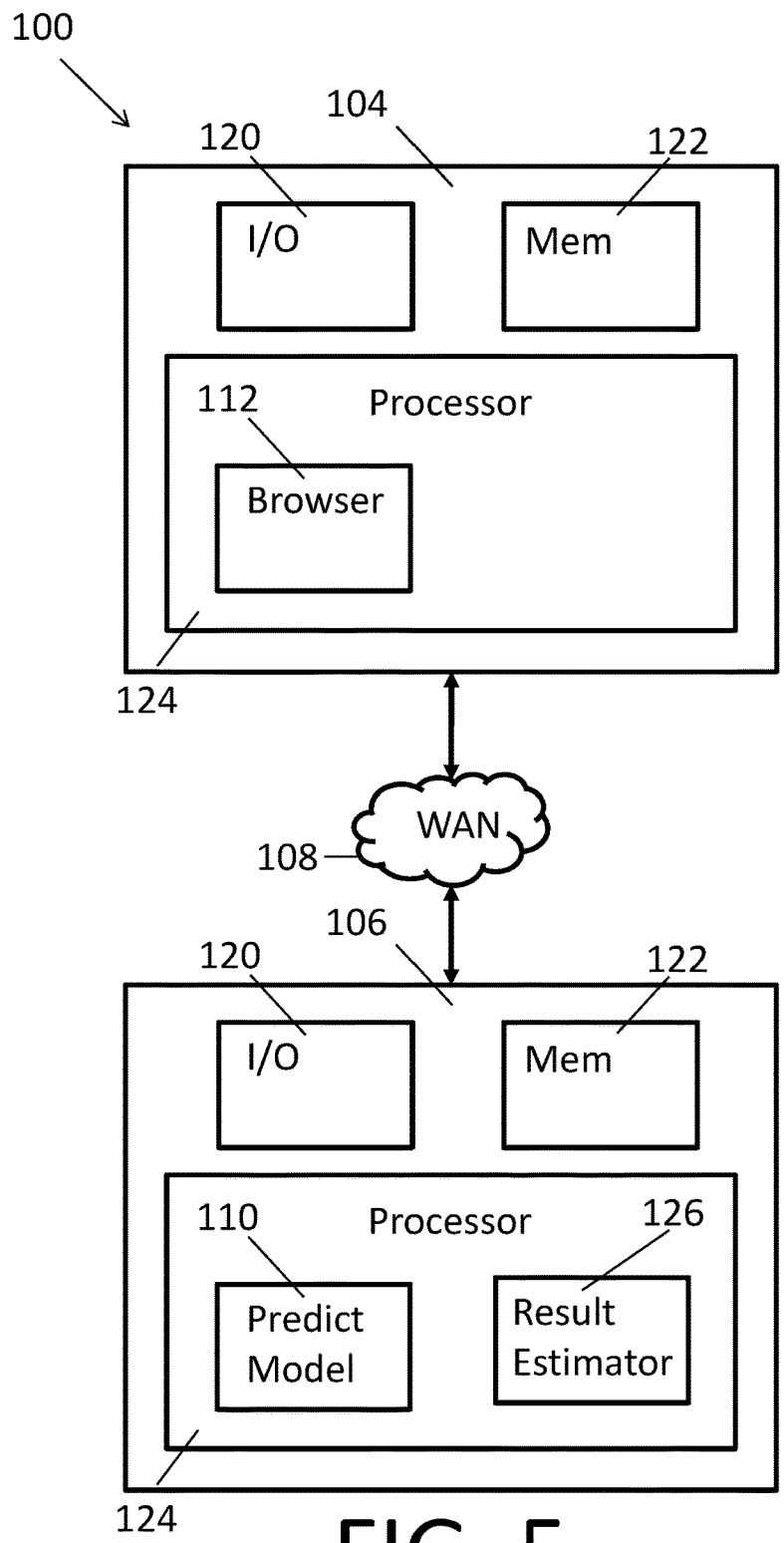

FIG. 4 depicts, in greater detail, another hardware system 100 configured to host an estimated result calculation system 102 according to one embodiment. Like the hardware system 100 depicted in FIG. 1, the hardware system 100 in FIG. 4 includes a server computing device 104 and a user computing device 106 that are operatively coupled by a network 108. The server computing device 104 includes an input/output module 120, a memory module 122 and a processor 124. The user computing device 106 includes an input/output module 120, a memory module 122 and a processor 124. The input/output modules 120 are configured to communicate with and facilitate the receipt and transfer of taxpayer data, including data relating to the relevance of taxpayer data sources and relevance values. The memory modules 122 are configured to store tax data, including data relating to the relevance of taxpayer data sources and sequences of taxpayer data sources, in proper formats for tax data acquisition and estimated result calculation. The processors 124 in the server computing device 104 and the user computing device 106 are configured to respectively run programs (i.e., predictive model 110, result estimator 126, and browser 112), as shown in FIG. 5.

Figure 6:
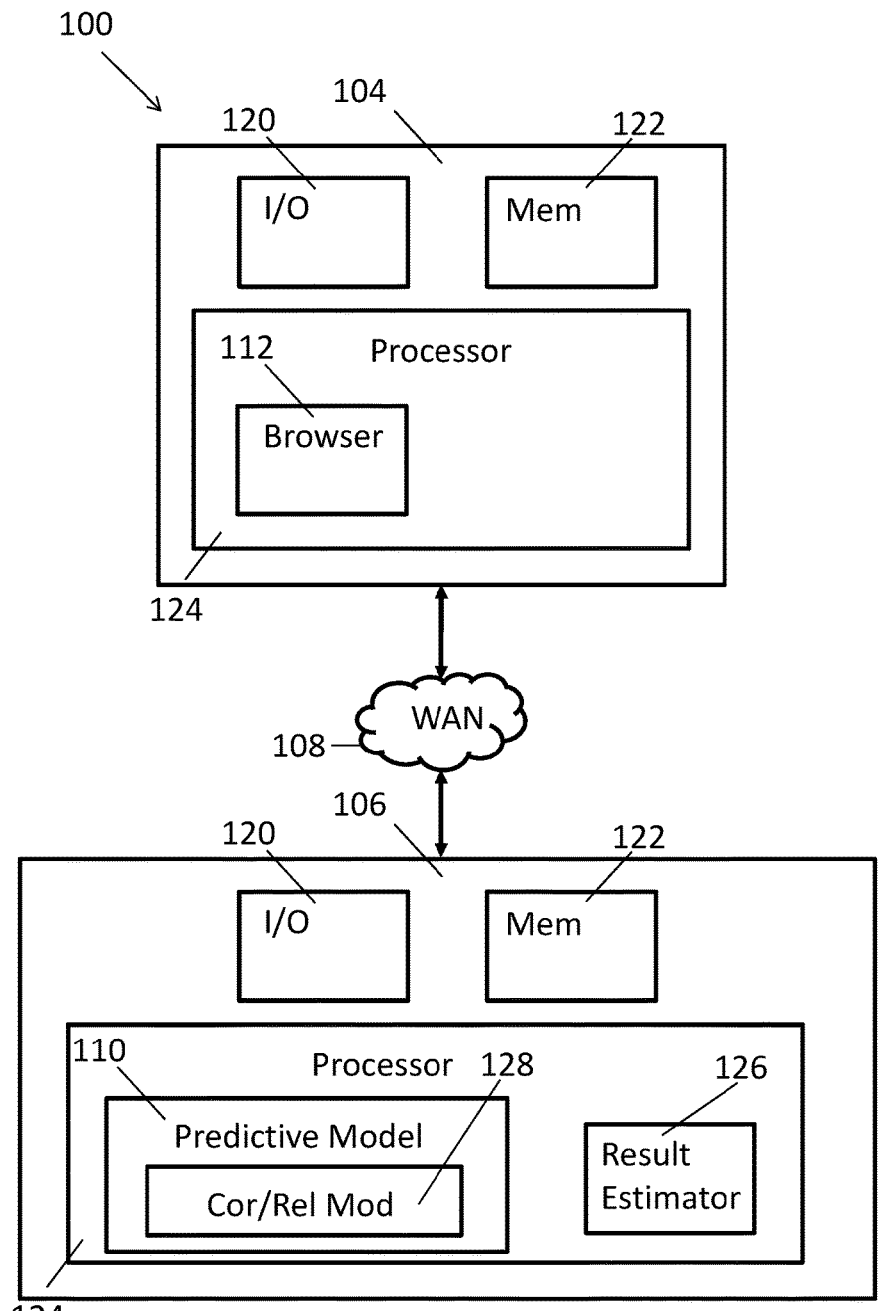

FIG. 6 depicts, in even greater detail, another hardware system 100 configured to host an estimated result calculation system 102 according to one embodiment. Like the hardware system 100 depicted in FIG. 1, the hardware system 100 in FIG. 6 includes a server computing device 104 and a user computing device 106 that are operatively coupled by a network 108. The server computing device 104 includes an input/output module 120, a memory module 122 and a processor 124. The user computing device 106 includes an input/output module 120, a memory module 122 and a processor 124. The input/output modules 120 are configured to communicate with and facilitate the receipt and transfer of taxpayer data, including data relating to the relevance of taxpayer data sources and sequences of taxpayer data sources. The memory modules 122 are configured to store taxpayer data, including data relating to the relevance of taxpayer data sources and sequences of taxpayer data sources, in proper formats for tax data acquisition and estimated result calculation. The processors 124 in the server computing device 104 and the user computing device 106 are configured to respectively run programs (i.e., predictive model 110 and browser 112). The predictive model 110 includes a correlation/relevance module 128 configured to determine the correlation and relevance of a taxpayer data source and an estimated result for a particular taxpayer to each other. The result estimator 126 is configured to calculate an estimated tax result. The browser 112 is configured to transmit information to and receive information from the predictive model 110 and the result estimator 126. The browser 112 facilitates user interaction with the predictive model 110 and the result estimator 126.

Figure 7:
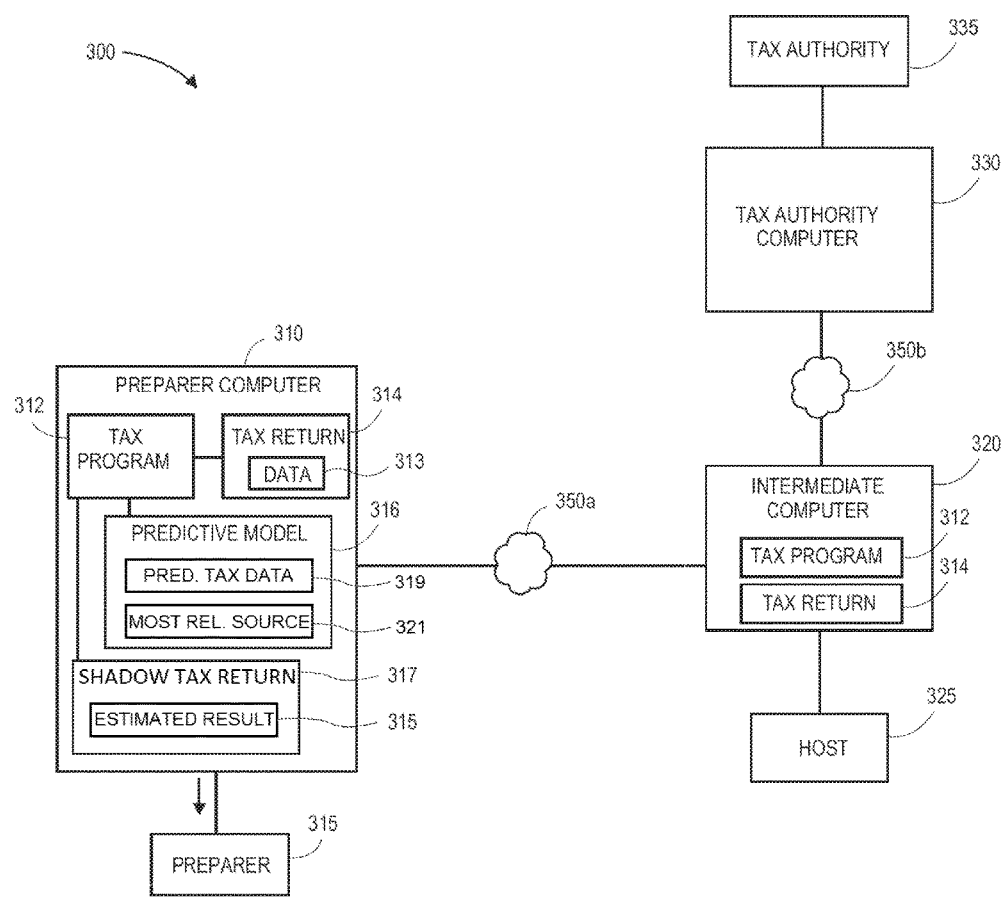

FIG. 7 depicts a system 300 for generating an estimated result 315 for a shadow tax return 317 that is presented to a preparer or user before the preparer or user begins to prepare an electronic tax return using an electronic tax return preparation program according to another embodiment. The system 300 comprises or involves a preparer computing apparatus or computing device 310 on which a tax return preparation program 312 (identified as "tax program" 312 in FIG. 7) executes to calculate an estimated result 315 before the system 300 instructs the tax return preparation program 312 to prepare an electronic tax return 314 (identified as "tax return" 314 in FIG. 7). The electronic tax return 314 will eventually include fields for tax return data 313 (data 313 in FIG. 7).

Preparer computing device 310 further comprises or accesses a special purpose predictive model 316, configured to (1) generate predicted tax data 319 and (2) identify a taxpayer data source 321 as most relevant to the estimated result for a particular taxpayer. FIG. 7 illustrates tax return preparation program 312 and predictive model 316 as separate programs, but in other embodiments, predictive model 316 may be a part or module of tax return preparation program 312. Further, while FIG. 7 illustrates tax return preparation program 312, predictive model 316 as running on the same preparer computing device 310, one or more of these system components may run on a remote computing device that is accessible by preparer computing device 310 through a network.

Examples of tax return preparation programs 312 that may be programmed to incorporate or utilize predictive model 316 according to embodiments include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif.

System 300 may also include or involve a special purpose intermediate computing device 320 managed by a host 325. Intermediate computing device 320 is specially or particularly configured or operable to host an on-line version of tax return preparation program 312 and/or format and electronically file electronic tax returns 314 (but not the shadow tax return 317) with a computing device 330 of a tax authority 335. Examples of a tax authority or other tax collecting entity include a federal tax authority, e.g., the Internal Revenue Service (IRS), a state tax authority or other tax collecting entity of the United States, a state thereof, or another country or state thereof (generally, "tax authority"). Examples of hosts 325 that provide the special purpose intermediate computing device 320 include, for example, Intuit Inc., which provides a second or intermediate computing device 320 or server of the Intuit Electronic Filing Center for electronically filing tax returns 312 and other hosts 325 that provide tax return preparation programs 312 and electronic filing servers.

In the illustrated embodiment, tax return preparation program 312 is a local program that executes on preparer computing device 310, but embodiments may also involve on-line tax return preparation programs 312 hosted by intermediate computing device 320 or a separate computing apparatus or server (not shown in FIG. 7) and accessed by a browser running on a preparer computing device 310. For ease of explanation, reference is made generally to tax return preparation program 312 and predictive model 316.

For these and other communication purposes, preparer computing device 310 is operably coupled to or in communication with second or intermediate computing device 320 through a network 350*a*, and intermediate computing device 320 is operably coupled to or in communication with tax authority computing device 330 through a network 350*b*. Each of the networks 350*a-b* and other networks 108 discussed herein (generally, network 108, 350) may be different, or two or more networks 108, 350 may be the same depending on the system configuration and communication protocols employed. One or more or all of networks 108, 350 may be, for example, a wireless or cellular network, a Local Area Network (LAN) and/or a Wide Area Network (WAN). Reference to network 108, 350 generally is not intended to refer to a specific network or communications protocol, and embodiments can be implemented using various networks 108, 350 and combinations thereof.

Figure 8:
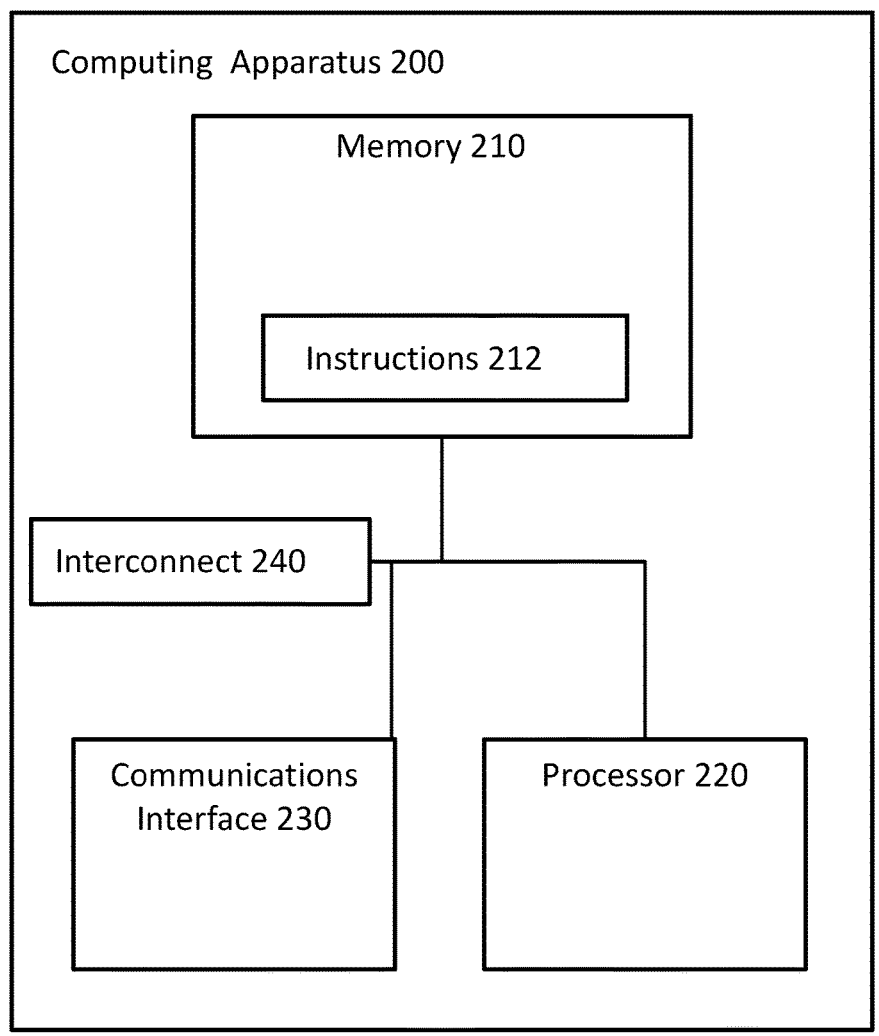
FIG. 8 is a block diagram of a computing apparatus or system in which various embodiments may be implemented or that may be utilized to execute various embodiments.

FIG. 8 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network.

Accordingly, the system configuration provided in FIG. 8 is provided to generally illustrate how embodiments may be configured and implemented. The processors 124 in the server computing device 104 and the user computing device 106 are programmed with respective browser 112, predictive model 110 and result estimator 126 so that they are no longer generic computing devices.

Having described various aspects of estimated result calculation systems according to various embodiments, computer-implemented methods for calculating estimated results using the estimated result calculation systems before a user begins to prepare an electronic tax return using an electronic tax return preparation program will now be described. The methods also include identifying a taxpayer data source as relevant to the estimated result of a particular taxpayer and determining the relevance value associated with that taxpayer data source.

Figure 9:
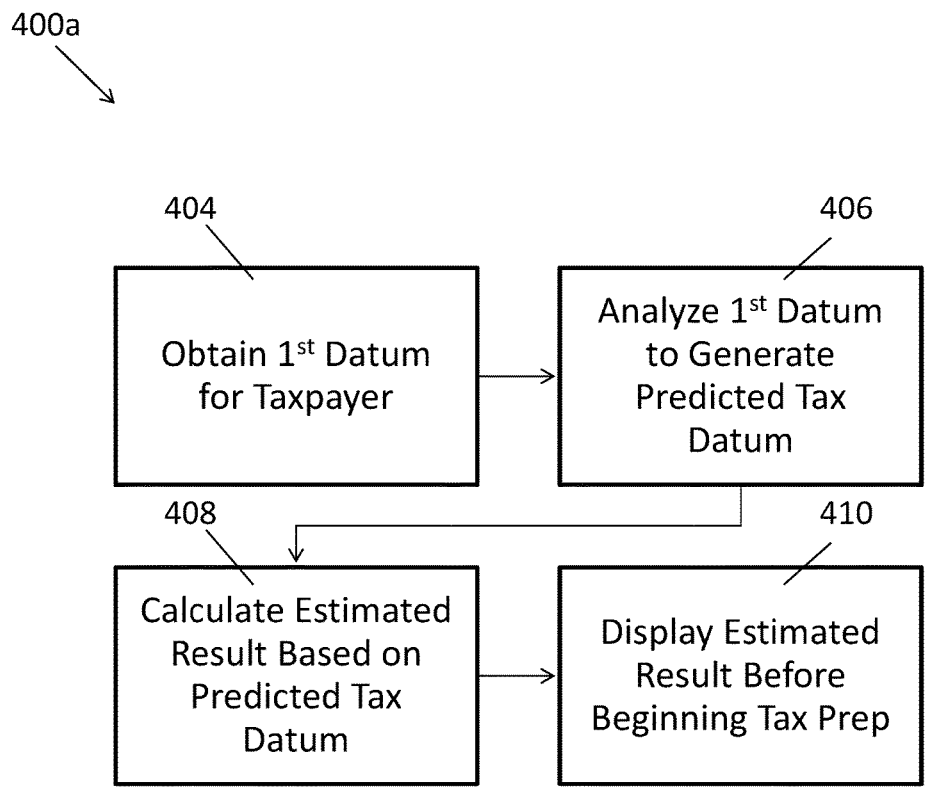
FIGS. 9 to 16 are flow charts depicting computer-implemented methods of calculating estimated results before a user begins to prepare an electronic tax return using an electronic tax return preparation program according to various embodiments.

FIG. 9 depicts a computer-implemented method 400*a* for calculating estimated results before a user begins to prepare an electronic tax return using an electronic tax return preparation program according to one embodiment. The method 400*a* may be implemented using the estimated result calculation systems (e.g., 102) running on the hardware systems (e.g., 100, 300) depicted in FIGS. 1-7.

At step 404, the system 100, 300 obtains a first taxpayer datum associated with a taxpayer. The first taxpayer datum may be obtained by a server computing device 104, which may, in turn, obtain the first taxpayer datum from a user computing device 106. The user computing device 106, may, in turn, obtain the first taxpayer datum from a taxpayer data source computer 116 (e.g., as shown in FIG. 2) or directly from a user. Alternatively, the server computing device 104 may obtain the first taxpayer datum from a taxpayer data source computer 116 (e.g., as shown in FIG. 2). The taxpayer data source computer 116 may be a third party computer, as described above. In embodiments where the first taxpayer datum is obtained from a taxpayer data source computer 116, the first taxpayer datum may be obtained without user intervention.

The first taxpayer datum may be information that affects a user's income tax burden, including information typically included in a tax return. However, the first taxpayer datum may be information that is not typically included in a tax return (e.g., personal information, Internet history, etc.)

At step 406, the system 100, 300 (in particular, the correlation/relevance module 128 of the predictive model 110 running on the server computing device 104) analyzes the first taxpayer datum to generate a predicted taxpayer datum. The predictive model 110 running on the system 100, 300 can analyze the first taxpayer datum to identify a predicted taxpayer datum according to various embodiments of predictive models 110, as described below.

In one embodiment, the predictive model includes data analytics or "big data" analytics. The predictive model may include "cohort analysis," in which various data analytics techniques are used to identify cohorts with similar results. Then the particular taxpayer may be placed into one or more cohorts based on the collected taxpayer data. The cohorts can then be used to generate an estimated result before beginning preparation of an electronic tax return.

Cohorts may include specific subsets for various taxpayer characteristics. For example, occupation and geographical location may be highly correlative/predictive of tax due/refund for high school teachers in Los Angeles, but not for software engineers in San Francisco.

Also, multiple taxpayer characteristics may define a cohort. For example, tax due/refund may strongly correlate with age, but only when the taxpayer is a barista is St. Louis.

The predictive model may include identifying a predictor for a taxpayer data category that can be used to calculate the desired estimated result. For example, cohort analysis may determine that neither age nor occupation correlates with tax due/refund. However, cohort analysis also determines that age strongly correlates with adjusted gross income and occupation strongly correlates with deductions, credits and payments. This data can be combined to predict tax due/refund as adjusted gross income minus deductions, credits and payments.

The first taxpayer datum can be collected from a variety of sources. For instance, taxpayer data can be collected from proprietary sources (e.g., internal sources such as payroll products, consumer finance products, etc.) Taxpayer data can also be collected from census data. Taxpayer data can further be collected from various government sources (e.g., property tax records, DMV, etc.) Moreover, taxpayer data can be collected from third party commercial sources (e.g., credit reports). In addition, taxpayer data can be collected from internet usage data (e.g. sites visited).

Other applications of predictive models to estimate taxpayer data are described in U.S. application Ser. No. 14/674,582, filed Mar. 31, 2015, the contents of which have been previously incorporated-by-reference herein.

Returning to the method 400a depicted in FIG. 9, at step 408, the system 100, 300 (e.g., the user computing device 106) calculates an estimated result based at least on the predicted taxpayer datum. Other yet-to-be-obtained taxpayer data can be estimated for this calculation by iteratively applying the techniques described above. Alternatively, other yet-to-be-obtained taxpayer data can be assigned their null or zero value.

Finally, at step 410, the system 100, 300 (e.g., the user computing device 106) displays the estimated result to the user before the user begins to prepare an electronic tax return using an electronic tax return preparation program. The user computing device 106 may display the estimated result after each item of taxpayer data is obtained. The user computing device 106 may display the estimated result in a browser 112 on a visual display/screen 114 of the user computing device 106.

This method 400 allows a user to obtain an estimated tax result before the user begins to prepare their electronic tax return using an electronic tax return preparation program. This early estimated tax result facilitates long term financial planning and improves the engagement of a user.

Figure 10:
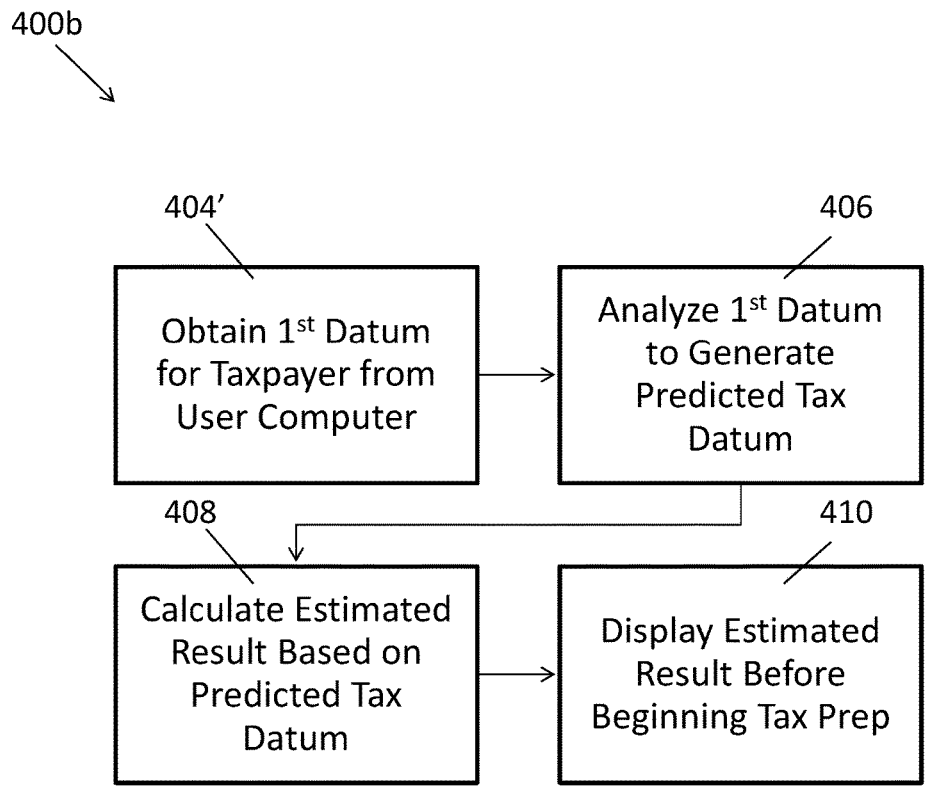

FIG. 10 depicts a computer-implemented method 400b for calculating estimated results before a user begins to prepare an electronic tax return using an electronic tax return preparation program according to another embodiment. The method 400b may be implemented using the estimated result calculation systems (e.g., 102) running on the hardware systems (e.g., 100, 300) depicted in FIGS. 1-7.

The method 400b depicted in FIG. 10 is almost identical to the method 400a depicted in FIG. 9. The difference is that, in step 404', the server computing device 104 obtains the first taxpayer datum for the taxpayer from the user computing device 106 through the network 108. The remaining steps depicted in FIG. 10 are identical to the corresponding steps depicted in FIG. 9 and described above.

Figure 11:
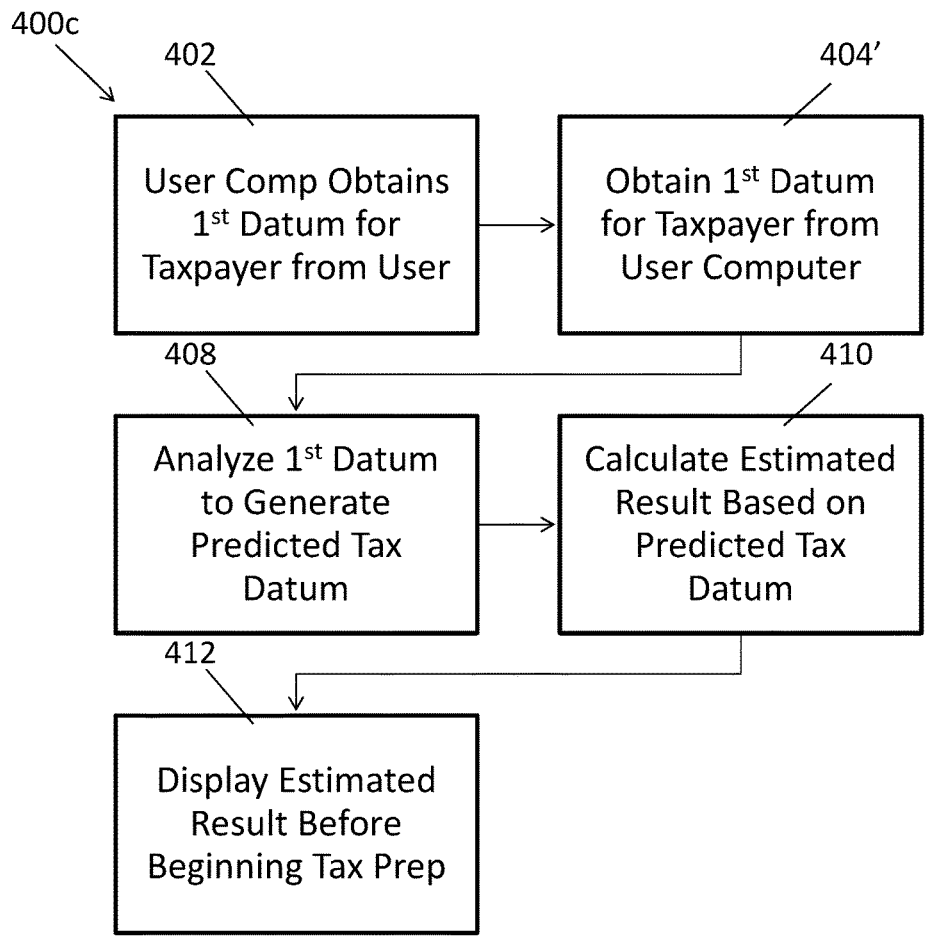

FIG. 11 depicts a computer-implemented method 400c for calculating estimated results before a user begins to prepare an electronic tax return using an electronic tax return preparation program according to still another embodiment. The method 400c may be implemented using the estimated result calculation systems (e.g., 102) running on the hardware systems (e.g., 100, 300) depicted in FIGS. 1-7.

The method 400c depicted in FIG. 11 is almost identical to the method 400b depicted in FIG. 10. The difference is the addition of step 402 before step 404'. In step 402, the user computing device 106 obtains the first taxpayer datum for the taxpayer from the user as described above. The user computing device 106 may utilize a user interface in the browser 112 to obtain the first taxpayer datum. The remaining steps depicted in FIG. 11 are identical to the corresponding steps depicted in FIG. 10 and described above.

Figure 12:
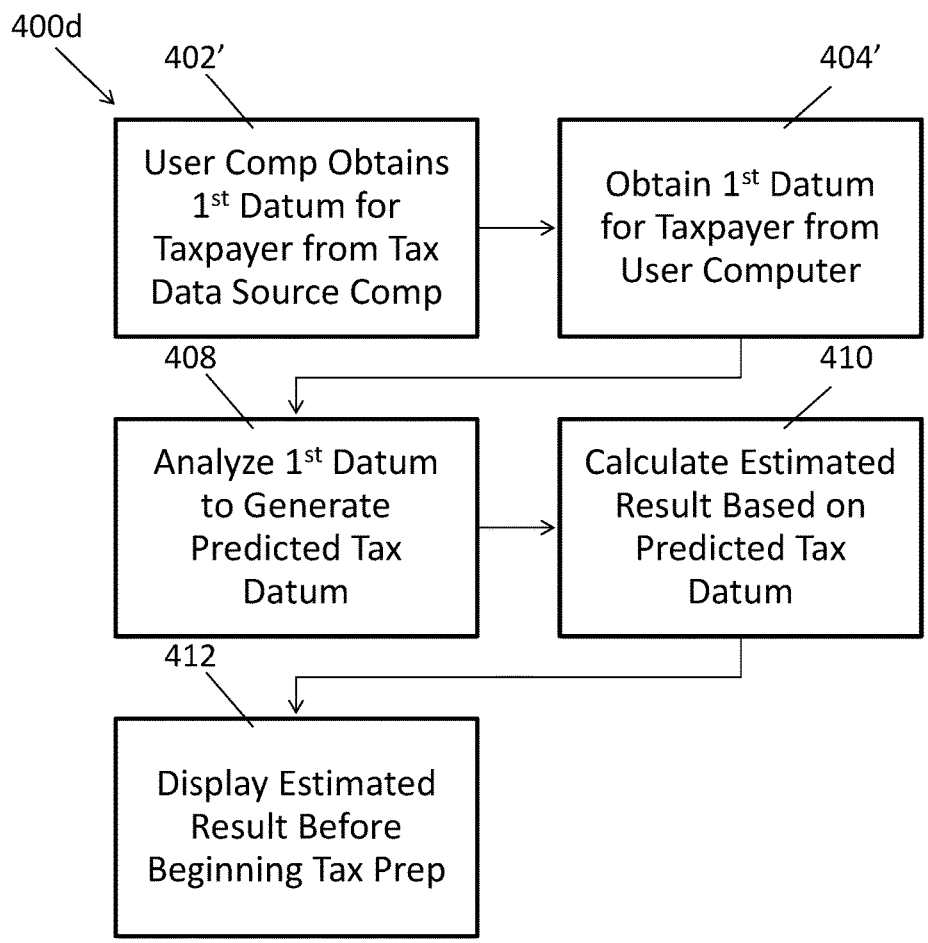

FIG. 12 depicts a computer-implemented method 400d for calculating estimated results before a user begins to prepare an electronic tax return using an electronic tax return preparation program according to yet another embodiment. The method 400d may be implemented using the estimated result calculation systems (e.g., 102) running on the hardware systems (e.g., 100, 300) depicted in FIGS. 1-7.

The method 400d depicted in FIG. 12 is almost identical to the method 400b depicted in FIG. 10. The difference is the addition of step 402' before step 404'. In step 402', the user computing device 106 obtains the first taxpayer datum for the taxpayer from a taxpayer data source computing device 116 through the network 108 as described above. The remaining steps depicted in FIG. 12 are identical to the corresponding steps depicted in FIG. 10 and described above.

Figure 13:
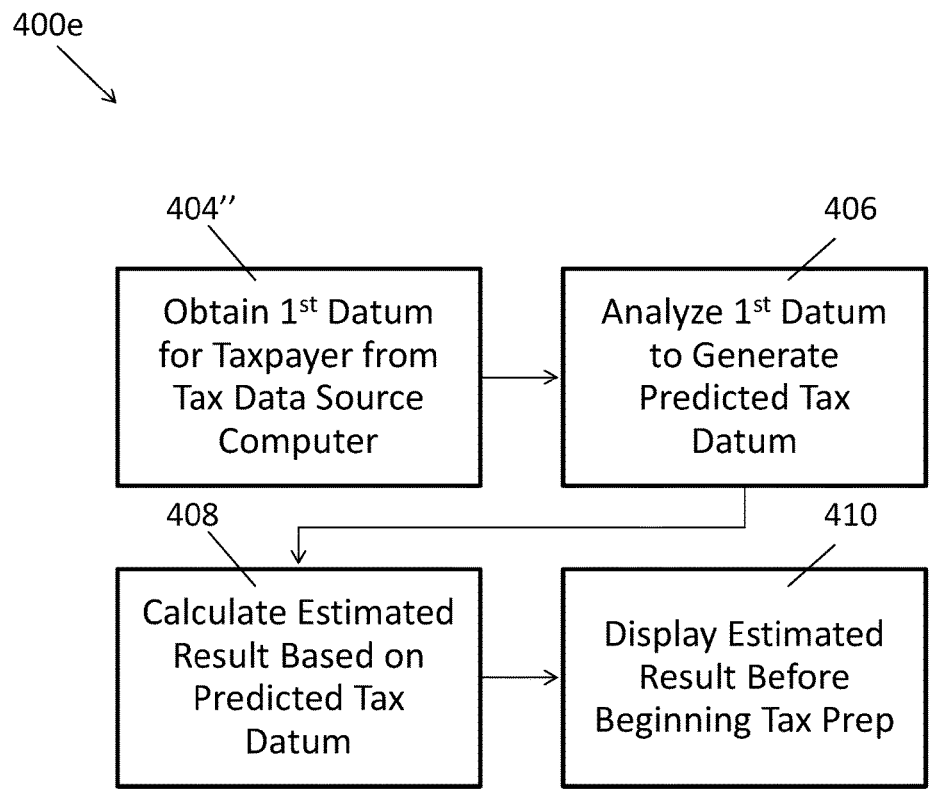

FIG. 13 depicts a computer-implemented method 400e for calculating estimated results before a user begins to prepare an electronic tax return using an electronic tax return preparation program according to another embodiment. The method 400e may be implemented using the estimated result calculation systems (e.g., 102) running on the hardware systems (e.g., 100, 300) depicted in FIGS. 1-7.

The method 400e depicted in FIG. 13 is almost identical to the method 400a depicted in FIG. 9. The difference is that, in step 404", the server computing device 104 obtains the first taxpayer datum for the taxpayer from a taxpayer data source computing device 116 through the network 108 as described above. The remaining steps depicted in FIG. 13 are identical to the corresponding steps depicted in FIG. 9 and described above.

Figure 14:
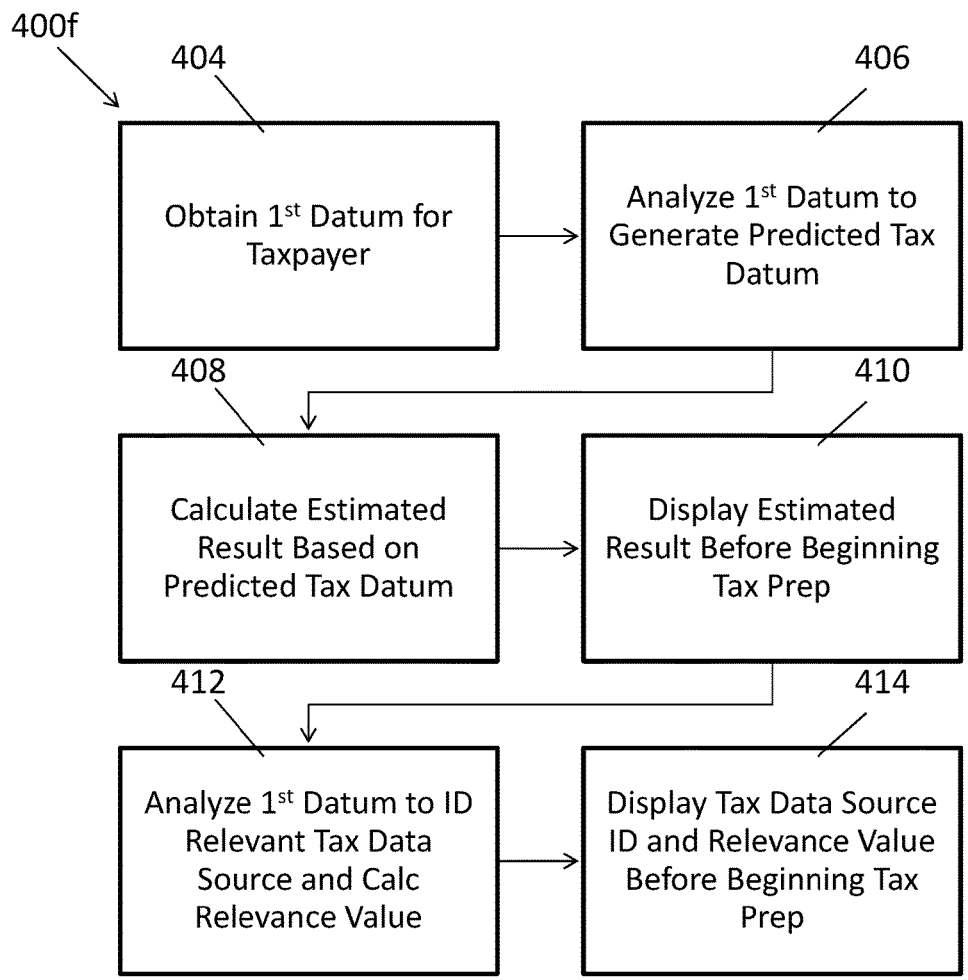

FIG. 14 depicts a computer-implemented method 400f for calculating estimated results before a user begins to prepare an electronic tax return using an electronic tax return preparation program according to another embodiment. The method 400f may be implemented using the estimated result calculation systems (e.g., 102) running on the hardware systems (e.g., 100, 300) depicted in FIGS. 1-7.

The method 400f depicted in FIG. 14 is almost identical to the method 400a depicted in FIG. 9. The difference is the addition of steps 412 and 414 after step 410. In step 412, the system 100, 300 (in particular, the correlation/relevance module 128 of the predictive model 110 running on the server computing device 104) analyzes the first taxpayer datum to (1) identify a taxpayer data source as relevant to the estimated result for the taxpayer, and (2) determine a relevance value associated with the relevant taxpayer data source. The correlation/relevance module 128 of the predictive model 110 can identify the relevant taxpayer data source and determine the associated relevance value as described in U.S. application Ser. No. 15/008,025, filed Jan. 27, 2016, the contents of which have been previously incorporated-by-reference herein. The system 100, 300 may also identify and determine more a pre-determined number of relevant taxpayer data sources and relevance values.

The predictive model may include calculating a Pearson product-moment correlation coefficient, which is defined as the covariance of two fields (e.g., a taxpayer data source datum and an estimated result) divided by the standard deviation of each field. For example, if wages (line 7 on Form 1040) and total tax (line 63 on Form 1040) have a Pearson product-moment correlation coefficient of 0.95, then wages (line 7 on Form 1040) is a very good predictor of total tax (line 63 on Form 1040). This technique is particularly effective when a large corpus of other tax returns (e.g., a group of the previous year's tax returns) is available for analysis to calculate the Pearson product-moment correlation coefficient. Further, the Pearson product-moment correlation coefficient can be used a scoring mechanism to determine how well one field predicts the value of another field.

In another example, Pearson product-moment correlation coefficient analysis can be applied to a large set of values for a taxpayer's home price and tax due/refund from taxpayers from the previous year. If the resulting coefficient is close to 1 or −1, then taxpayer's home price is a relevant taxpayer data source for tax due/refund. If the resulting coefficient is close to 0, then taxpayer's home price is not a relevant taxpayer data source for tax due/refund. The Pearson product-moment correlation coefficient can be used to calculate a relevance value for the taxpayer data source.

The predictive model may include sensitivity analysis to obtain the correlation between two fields (e.g., a taxpayer data source data and an estimated result). Sensitivity analysis generally includes making small changes to one field and observing the impact on another field. For example, for a set of estimated values for wages (line 7 on Form 1040—e.g., from a payroll processor or check stub) and tax due (line 63 on Form 1040), the tax due can be recomputed after the wages has been changed by a small percentage. If the resulting change to tax due (line is large, then wages is strongly correlated to (e.g., a good predictor for) tax due. Typical sensitivity analysis requires estimates for one or more taxpayer data source values (e.g., to understand the sensitivity of tax due on wages typically requires an estimate for wages). These taxpayer data source values can be estimated as described in U.S. application Ser. No. 14/674,582, filed Mar. 31, 2015, the contents of which have been previously incorporated-by-reference herein.

The predictive model may include analyzing a tax code. For example, line 4 on Schedule A is calculated from line 1 on Schedule A and line 38 on Form 1040 via a well-defined formula. Therefore, that formula determines the correlation between sources of data in line 4 on Schedule A, and line 1 on Schedule A and line 38 on Form 1040.

The predictive model may include determining a relationship between two fields by analyzing their respective relationships to a third field. For example, if wages (line 7 on Form 1040—e.g., from a payroll processor or check stub) are a good predictor of adjusted gross income (line 38 on Form 1040), and adjusted gross income is a good predictor of total tax (line 63 on Form 1040), then it follows that wages is at least a reasonable predictor of total tax.

This cascading of predictive values can also be used to calculate correlation coefficients/relevance values for a plurality of fields. For example, if wages predicts adjusted gross income with 90% accuracy and adjusted gross income predicts total tax with 80% accuracy, then it can be calculated that wages predict total tax with 72% (=90%×80%) accuracy. This calculation for determining the correlation coefficients/relevance values for cascaded predictors is only exemplary. The actual calculation will depend on the particular scoring mechanism.

The predictive model may include removing data/information with low predictive value. While other predictive models involve calculating the predictive value of a particular taxpayer data source independent of other taxpayer data categories, this predictive model begins with an estimate of all source (or the major categories) that typically impact a target field (e.g., estimated result). These taxpayer data source values can be estimated as described in U.S. application 14/674,582, filed Mar. 31, 2015, the contents of which have been previously incorporated-by-reference herein. Each estimated source is then analyzed to identify its predictive value for (correlation/relevance to) the target field as described above. Then, the source with the lowest predictive value is removed from the analysis, and the method is repeated until a single last taxpayer data source remains. This single last taxpayer data source is then identified as the most relevant taxpayer data source.

In one embodiment, the predictive model may include requesting the user to identify the taxpayer data source as the most relevant to the estimated result for the taxpayer. Any reference to specific fields in a tax form is based on the 2014 form set, but this method is applicable to any tax return preparation system.

At step 414, the system 100, 300 (e.g., the user computing device 106) displays the identity of the relevant estimated result and the associated relevance value to the user before the user begins to prepare an electronic tax return using an electronic tax return preparation program. The user computing device 106 may display the relevant estimated result and the associated relevance value after each item of taxpayer data is obtained. The user computing device 106 may display the relevant estimated result and the associated relevance value in a browser 112 on a visual display/screen 114 of the user computing device 106. The remaining steps depicted in FIG. 14 are identical to the corresponding steps depicted in FIG. 9 and described above.

Method 400f, in addition to displaying an estimated result to a user before the user begins to prepare an electronic tax return, also displays the identity of the relevant estimated result and the associated relevance value to the user before the user begins to prepare an electronic tax return. This allows the user and the system 100, 300 to more efficiently utilize time/energy/resources to obtain taxpayer data for estimating tax results.

Figure 15:
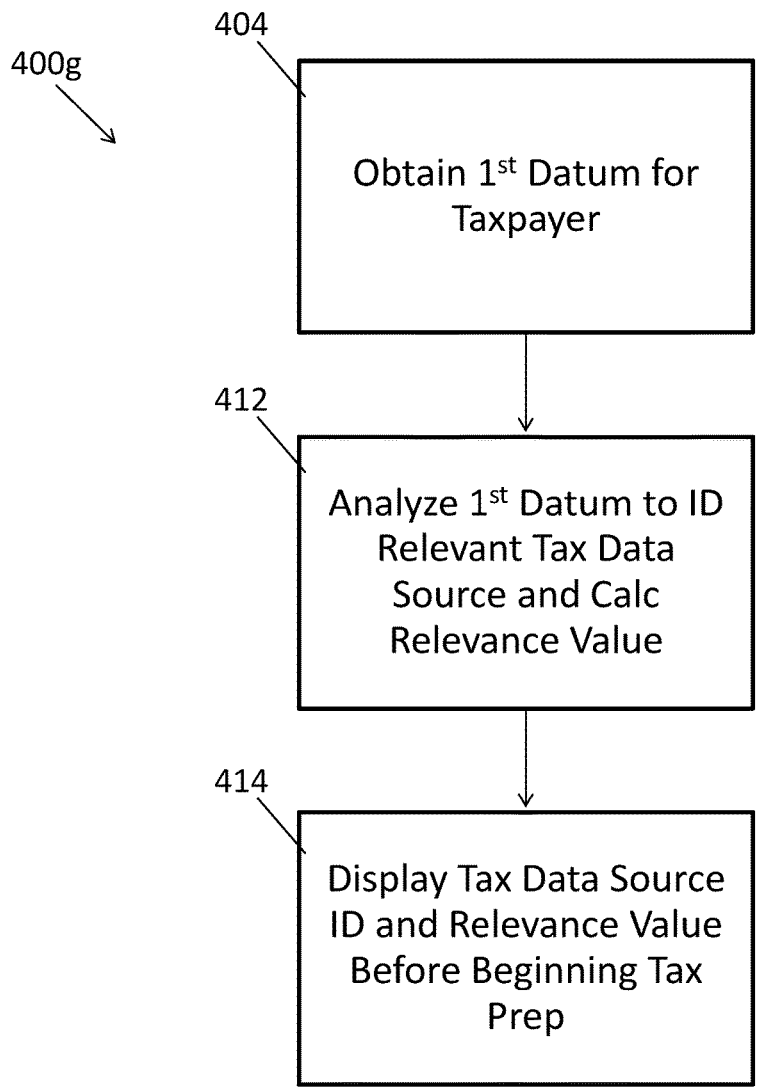

FIG. 15 depicts a computer-implemented method 400g for calculating estimated results before a user begins to prepare an electronic tax return using an electronic tax return preparation program according to another embodiment. The method 400g may be implemented using the estimated result calculation systems (e.g., 102) running on the hardware systems (e.g., 100, 300) depicted in FIGS. 1-7.

The method 400g depicted in FIG. 15 is similar to the method 400f depicted in FIG. 14. The difference is that steps 406, 408 and 410 from method 400f are missing from method 400g. The remaining steps depicted in FIG. 15 are identical to the corresponding steps depicted in FIG. 14 and described above.

Figure 16:
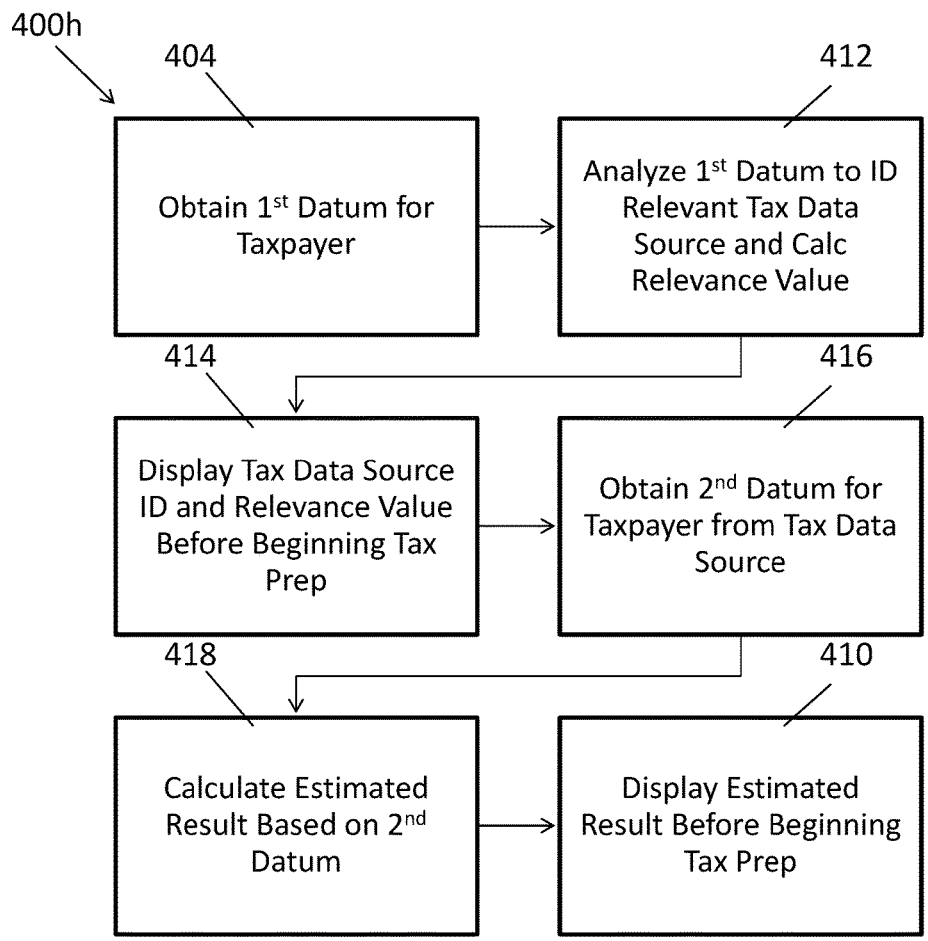

FIG. 16 depicts a computer-implemented method 400h for calculating estimated results before a user begins to prepare an electronic tax return using an electronic tax return preparation program according to another embodiment. The method 400h may be implemented using the estimated result calculation systems (e.g., 102) running on the hardware systems (e.g., 100, 300) depicted in FIGS. 1-7.

The method 400h depicted in FIG. 16 is similar to the method 400f depicted in FIG. 14. The difference is that steps 406 and 408 from method 400f have been replaced by steps 412, 414, 416 and 418 in method 400g. The remaining steps depicted in FIG. 16 are identical to the corresponding steps depicted in FIG. 14 and described above. Steps 412 and 414 are identical to the corresponding steps depicted in FIG. 15 and described above.

In step 416, the system 100, 300 obtains a second taxpayer datum from the taxpayer data source identified to the user as relevant in steps 412 and 414. In step 418, the system 100, 300 (e.g., the user computing device 106) calculates an estimated result based at least on the second taxpayer datum. Other yet-to-be-obtained taxpayer data can be estimated for this calculation as described above. Alternatively, other yet-to-be-obtained taxpayer data can be assigned their null or zero value.

While FIGS. 9-16 illustrate embodiments of using a single predicted taxpayer datum to calculate an estimated result, embodiments are not so limited. For example, the system 100, 300 may predict a plurality taxpayer data with which to calculate a more accurate estimated result. In addition, the system 100, 300 may identify a plurality of high relevance taxpayer data sources and obtain taxpayer data corresponding to those high relevance taxpayer data sources to calculate an even more accurate estimated result.

While FIGS. 9-16 illustrate a single predictive model 110 being used in each method 400a-h, embodiments are not so limited. For example, multiple predictive models can be applied to each set of taxpayer data sources and taxpayer data to arrive at a consensus as to the most relevant taxpayer data source and estimated result. Also, different predictive models or pluralities of predictive models can be applied to a time series of taxpayer data sources or taxpayer data. Accordingly, it will be understood that embodiments described are provided for purposes of illustration and explanation, not limitation, and embodiments may involve repeating execution of the same predictive model, selection of a different predictive model, or a combination of both embodiments.

In another embodiment, a method for calculating an estimated result before a user begins to prepare an electronic tax return using an electronic tax return preparation program includes an estimated result calculation system 102 collecting tax data from existing tax filers. For instance, by January $1^{st}$ of a tax year, the system 102 can have collected tax data from returns filed the previous tax year.

Next, the system 102 analyzes the collected tax data to identify cohorts and high relevance taxpayer data sources/fields for which the user has not yet obtained data based on obtained taxpayer data. A wide range of techniques can be used for this analysis as described above.

The system 102 can utilize data from various external sources to execute the methods described herein. In one embodiment, the data collected for analysis includes tax returns from other filers for previous years. In another embodiment, the data collected for analysis includes tax information from external sources (such as the IRS or state tax agencies).

The system 102 can utilize various taxpayer data to execute the method. In one embodiment, data used to identify cohorts and relevant taxpayer data sources for the current taxpayer includes information to which taxpayers have ready access. In another embodiment, data used to identify cohorts and relevant taxpayer data sources for the current taxpayer includes information from their previous tax returns. In still another embodiment, data used to identify cohorts and relevant taxpayer data sources for the current taxpayer includes information from external sources (such as county property tax records).

In one embodiment, the user may enter selected questions about the predicted final tax outcome. For example, "What assumptions were used in calculating the predicted final tax outcome?". In another embodiment, the system 102 may take initiative to interact with the user based on the amount of the predicted tax outcome or based on changes in the amount of the predicted tax outcome. In still another embodiment, the initiative taken by the system may include actions designed to improve the user experience. For example, taking a sympathetic tone, offering advice on how to get a better result, explain why the expected tax outcome is what it is, etc. In yet another embodiment, the initiative taken by the system may include simple social interaction. For example, encouragement, congratulations, consolation, etc.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

For example, while certain embodiments have been described with reference to simplified predictive model examples, predictive models can be substantially more complex such that predictive models, and combinations thereof, can be utilized across different types of taxpayer data and taxpayer data sources. For example, a simple example of a predictive model may involve more complex relationships, e.g., clustering tax returns based on zip code, wages, age using K-means, identifying which cluster a user belongs to, then using the mean for that cluster for the predicted tax datum, and with further complexity. These predictive model capabilities are not available in known tax return preparation applications.

Moreover, while embodiments have been described with reference to data that has been obtained, e.g., from the user or taxpayer data sources, predictive models may also be utilized to analyze data that is calculated or derived from other data.

While certain embodiments involving predictive models to identify a most relevant taxpayer data source and calculate an estimated result of a shadow tax return, embodiments may also be used together or concurrently.

Further, while the specification refers to certain predictive models that may be executed for use in embodiments, predictive models that can be utilized in embodiments can be created in various ways including, for example, using extrema values (min and max) on related tax returns, error ranges (range of uncertainty) for curves fitted to data in tax returns, clusters of similar users using naïve bayes, K-means clustering or other clustering techniques, a k-nearest neighbor algorithm, neural networks and logistic regression, and combinations of two or more of the aforementioned or other types of predictive models.

Moreover, the system 102 can execute predictive models at various times during the methods. As the system obtains more information about the user (either because the user has entered the information or because the system has obtained the information from another source on behalf of the user), that information is added to the collection of known facts about the user, and this may be used to re-evaluate or re-execute the predictive model such that a new most relevant taxpayer data source and a new estimated result is generated after the data was entered, and in response to new tax data that was entered and resulted in execution of a predictive model again or another predictive model. For example, a predictive model can be evaluated whenever new information is available about the user. The results of the evaluation of the predictive model may be accessed whenever it is required, which may result in the latest available results of the predictive model not being based on all available information about the user depending on when the predictive model is accessed and executed.

A predictive model can be evaluated (to completion) before the user is allowed to take any further action, thus providing immediate feedback to the user.

External data may be used to start the predictive model prediction process, or be utilized throughout the prediction process. For example, after a field is populated with first tax data, embodiments may involve executing a predictive model with the first tax data as an input, and then generating an output that is calculate an estimated result. In another embodiment, after a field is populated with first tax data, embodiments may involve executing a predictive model with the first tax data as an input and, in additional, one or more external data if available, and then generating an output that is used to calculate an estimated result in a shadow tax return. External data may be used as inputs into one or multiple predictive models that are executed simultaneously or in iterations as additional tax data is received.

According to one embodiment, external data is utilized as an input if or when it is available. According to another embodiment, external data is used to launch the predictive model, e.g., when there is sufficient data in the electronic tax return fields such that a pre-determined minimum number of fields, or pre-determined types or specific fields have been populated, then external data is no longer utilized and instead, only data of the electronic tax return is utilized as inputs to a predictive model.

Further, while certain embodiments have been described with reference to identifying a most relevant taxpayer data source and calculating estimated tax results by execution of one or more predictive models, embodiments may utilized one of these embodiments or both of these embodiments at different times or simultaneously. For example, when a user requests an updated estimated result, the system can execute one or more predictive models.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A system for calculating an estimated result for an electronic tax return to be prepared before a user begins to prepare the electronic tax return using an electronic tax return preparation program, the system comprising:

a server computer including a server processor, a server memory and a server input/output module, wherein the server memory stores a predictive model and a result estimator, the predictive model and the result estimator being executed by the server processor; and a user computer including a user processor, a user memory and a user input/output module, wherein the user memory stores a browser program, wherein the user computer and the browser program are operatively coupled through the user input/output module to the server processor and the predictive model, respectively, through the server input/output module by a network, wherein the server processor is configured to obtain a first taxpayer datum associated with a taxpayer, obtaining the first taxpayer datum including:

identifying a plurality of taxpayer data sources, analyzing the plurality of taxpayer data sources to identify a respective predictive value for each of the plurality of taxpayer data sources, remove at least one of the taxpayer data sources having a low predictive value based on the analyzing, and designating at least one of the taxpayer data sources not removed as the source from which the first taxpayer datum is obtained, thereby reducing a total number of taxpayer data sources accessed to obtain the first taxpayer datum, wherein the server processor is configured to execute the predictive model to generate a predicted taxpayer datum for the taxpayer based on the first taxpayer datum and store the predicted tax payer datum in the server memory, executing the predictive model including:
  determining at least one relationship between at least two fields of the predictive model to identify at least one first field that is predictive of at least one other field,
  based on the determining, predicting the taxpayer datum related to the at least one other field based on the first taxpayer datum related to the at least one first field,
  wherein the server processor is configured to execute the result estimator to calculate the estimated result using the predicted taxpayer datum stored in the server memory and store the estimated result in the server memory,
  wherein the server input/output module is configured to send the estimated result to the user input/output module, and
  wherein the user processor is configured to display the estimated result to the user before the user begins to prepare the electronic tax return using the electronic tax return preparation program.

2. The system of claim 1, wherein the user processor is configured to display the estimated result to the user before the electronic tax return preparation program is available from a source.

3. The system of claim 1, wherein the user processor is configured to display the estimated result to the user before the electronic tax return preparation program is updated.

4. The system of claim 1, wherein the user processor is configured to display the estimated result to the user before the electronic tax return preparation program is purchased by the user.

5. The system of claim 1, wherein the user processor is configured to display the estimated result to the user before a tax document is available from an employer of the user.

6. The system of claim 1, wherein the user processor is configured to display the estimated result to the user before a tax document is available from a financial institution hosting a financial account of the user.

7. The system of claim 1, wherein the user processor is configured to display the estimated result to the user before the user has filed a tax return for the prior tax year.

8. The system of claim 1, wherein the user processor is configured to display the estimated result to the user before all taxpayer data required to prepare the electronic tax return is available to the user.

9. The system of claim 1, wherein the user processor is configured to display the estimated result to the user even when the user is not able to begin preparing the electronic tax return.

10. The system of claim 1, wherein the predictive model is an algorithm that was created using a modeling technique selected from the group consisting of Pearson product-moment correction; sensitivity analysis; logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

11. The system of claim 1, wherein the server processor is configured to obtain the first taxpayer datum from the user.

12. The system of claim 1, wherein the server processor is configured to obtain the first taxpayer datum from a taxpayer data computer.

13. The system of claim 12, wherein the taxpayer data computer is a third party computer.

14. The system of claim 12, wherein the taxpayer data computer is associated with a source selected from the group consisting of a proprietary source, a census data source, a government source, a commercial source, and an Internet history source.

15. The system of claim 1, wherein the server processor is configured to obtain a second taxpayer datum associated with the taxpayer, wherein the predictive model, when executed, analyzes the second taxpayer datum to identify a taxpayer data source as relevant to the estimated result for the taxpayer, and to determine a relevance value associated with the estimated result for the taxpayer, and wherein the user computer is configured to display an identity of the taxpayer data source and the associated relevance value to the user before the user begins to prepare the electronic tax return using the electronic tax return preparation program.

16. The system of claim 15, wherein the associated relevance value is relative to all taxpayers.

17. The system of claim 15, wherein the associated relevance value is relative to the taxpayer.

18. The system of claim 15, wherein the server processor is configured to obtain the second taxpayer datum from the user.

19. The system of claim 15, wherein the server processor is configured to obtain the second taxpayer datum from a taxpayer data computer.

20. The system of claim 19, wherein the taxpayer data computer is a third party computer.

21. The system of claim 19, wherein the taxpayer data computer is associated with a source selected from the group consisting of a proprietary source, a census data source, a government source, a commercial source, and an Internet history source.

22. The system of claim 1, wherein the predictive model includes data analytics.

23. The system of claim 1, wherein executing the predictive model includes calculating a Pearson product-moment correlation coefficient.

24. The system of claim 1, wherein executing the predictive model includes performing a cohort analysis.

25. The system of claim 1, wherein the server processor executing the predictive model includes determining a correlation between a plurality of taxpayer data categories and the estimated result.

26. The system of claim 1, wherein the server processor executing the predictive model includes determining a correlation between a first taxpayer data category and second taxpayer data category, and wherein the server processor is configured to calculate the estimated result using taxpayer data associated with the second taxpayer data category.

27. A computer implemented method for calculating an estimated result for an electronic tax return to be prepared before a user begins to prepare the electronic tax return using an electronic tax return preparation program, the method comprising:
  obtaining with a server processor a first taxpayer datum associated with a taxpayer, obtaining the first taxpayer datum including:
    identifying a plurality of taxpayer data sources,
    analyzing the plurality of taxpayer data sources to identify a respective predictive value for each of the plurality of taxpayer data sources,
    remove at least one of the taxpayer data sources having a low predictive value based on the analyzing, and designating at least one of the taxpayer data sources not removed as the source from which the first taxpayer datum is obtained, thereby reducing a total number of taxpayer data sources accessed to obtain the first taxpayer datum;

executing with a server processor a predictive model stored in the server memory, executing the predictive model including:

determining at least one relationship between at least two fields of the predictive model to identify at least one first field that is predictive of at least one other field, based on the determining, predicting the taxpayer datum related to the at least one other field based on the first taxpayer datum related to the at least one first field;

generating with a server processor a predicted taxpayer datum for the taxpayer based on the first taxpayer datum;

calculating with the server processor the estimated result using the predicted taxpayer datum;

transmitting with the estimated result from a server input/output module to a user input/output module; and displaying with the user processor the estimated result to the user before the user begins to prepare the electronic tax return using the electronic tax return preparation program.

28. The method of claim 27, wherein the estimated result is displayed to the user before the electronic tax return preparation program is available from a source.

29. The method of claim 27, wherein the estimated result is displayed to the user before the electronic tax return preparation program is updated.

30. The method of claim 27, wherein the estimated result is displayed to the user before the electronic tax return preparation program is purchased by the user.

31. The method of claim 27, wherein the estimated result is displayed to the user before a tax document is available from an employer of the user.

32. The method of claim 27, wherein the estimated result is displayed to the user before a tax document is available from a financial institution hosting a financial account of the user.

33. The method of claim 27, wherein the estimated result is displayed to the user before the user has filed a tax return for the prior tax year.

34. The method of claim 27, wherein the estimated result is displayed to the user before all taxpayer data required to prepare the electronic tax return is available to the user.

35. The method of claim 27, wherein the estimated result is displayed to the user even when the user is not able to begin preparing the electronic tax return.

36. The method of claim 27, wherein the predictive model is an algorithm that was created using a modeling technique selected from the group consisting of Pearson product-moment correction; sensitivity analysis; logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

37. The method of claim 27, wherein the first taxpayer datum is obtained from the user.

38. The method of claim 27, wherein the first taxpayer datum is obtained from a taxpayer data computer.

39. The method of claim 38, wherein the taxpayer data computer is a third party computer.

40. The method of claim 38, wherein the taxpayer data computer is associated with a source selected from the group consisting of a proprietary source, a census data source, a government source, a commercial source, and an Internet history source.

41. The method of claim 27, further comprising: obtaining a second taxpayer datum associated with the taxpayer; analyzing the second taxpayer datum to identify a taxpayer data source as relevant to the estimated result for the taxpayer, and to determine a relevance value associated with the estimated result for the taxpayer; and displaying an identity of the taxpayer data source and the associated relevance value to the user before the user begins to prepare the electronic tax return using the electronic tax return preparation program.

42. The method of claim 41, wherein the associated relevance value is relative to all taxpayers.

43. The method of claim 41, wherein the associated relevance value is relative to the taxpayer.

44. The method of claim 41, wherein the second taxpayer datum is obtained from the user.

45. The method of claim 41, wherein the second taxpayer datum is obtained from a taxpayer data computer.

46. The method of claim 45, wherein the taxpayer data computer is a third party computer.

47. The method of claim 45, wherein the taxpayer data computer is associated with a source selected from the group consisting of a proprietary source, a census data source, a government source, a commercial source, and an Internet history source.

48. The method of claim 27, wherein the predictive model includes data analytics.

49. The method of claim 27, wherein executing the predictive model includes calculating a Pearson product-moment correlation coefficient.

50. The method of claim 27, wherein executing the predictive model includes performing a cohort analysis.

51. The method of claim 27, wherein executing the predictive model includes determining a correlation between a plurality of taxpayer data categories and the estimated result.

52. The method of claim 27, wherein executing the predictive model includes determining a correlation between a first taxpayer data category and second taxpayer data category, the method further comprising calculating the estimated result using taxpayer data associated with the second taxpayer data category.

* * * * *